United States Patent
Gordon et al.

(10) Patent No.: US 7,707,608 B2
(45) Date of Patent: Apr. 27, 2010

(54) MESSAGING PROTOCOL FOR INTERACTIVE DELIVERY SYSTEM

(75) Inventors: Donald F. Gordon, Los Altos, CA (US); Jeremy S. Edmonds, Redwood City, CA (US); John P. Comito, Redwood City, CA (US); Sadik Bayrakeri, Foster City, CA (US)

(73) Assignee: Cox Communications, Inc., Atlanta, GA (US)

( * ) Notice: Subject to any disclaimer, the term of this patent is extended or adjusted under 35 U.S.C. 154(b) by 671 days.

(21) Appl. No.: 11/564,881

(22) Filed: Nov. 30, 2006

(65) Prior Publication Data

US 2007/0089141 A1   Apr. 19, 2007

Related U.S. Application Data

(62) Division of application No. 09/708,809, filed on Nov. 8, 2000, now Pat. No. 7,146,628.

(51) Int. Cl.
*G06F 3/00* (2006.01)
*G06F 13/00* (2006.01)
*H04N 5/445* (2006.01)

(52) U.S. Cl. ................................ 725/54; 725/39; 725/148

(58) Field of Classification Search .................... 725/39, 725/40, 41, 42, 43, 46, 44, 49, 54, 118, 148
See application file for complete search history.

(56) References Cited

U.S. PATENT DOCUMENTS

| | | | |
|---|---|---|---|
| 5,481,542 A | 1/1996 | Logston et al. | |
| 5,844,620 A | 12/1998 | Coleman et al. | |
| 5,867,208 A * | 2/1999 | McLaren | 725/139 |
| 5,907,323 A * | 5/1999 | Lawler et al. | 725/41 |
| 6,160,545 A | 12/2000 | Eyer et al. | |
| 6,563,515 B1 | 5/2003 | Reynolds et al. | |
| 2003/0145323 A1* | 7/2003 | Hendricks et al. | 725/34 |

* cited by examiner

*Primary Examiner*—Ngoc K. Vu
(74) *Attorney, Agent, or Firm*—Merchant & Gould

(57) ABSTRACT

Efficient messaging techniques that facilitate interactive program guide (IPG) delivery and allow a terminal to specifically designate requested items of information from a server. The IPG can be provided via a number of IPG pages, with each page including a number of defined regions. In one method, selection for a particular region of a particular page is received at a terminal and a determination is made whether the selected region is currently received. If the answer is no, a request for the selected region is generated and sent to a server. The request can conform to a particular message format that includes a number of fields, e.g., a region ID field that identifies the selected region, a subtype field that identifies a particular type, a time slot field that identifies a specific time slot, and a page offset field that identifies a specific page from among many.

25 Claims, 21 Drawing Sheets

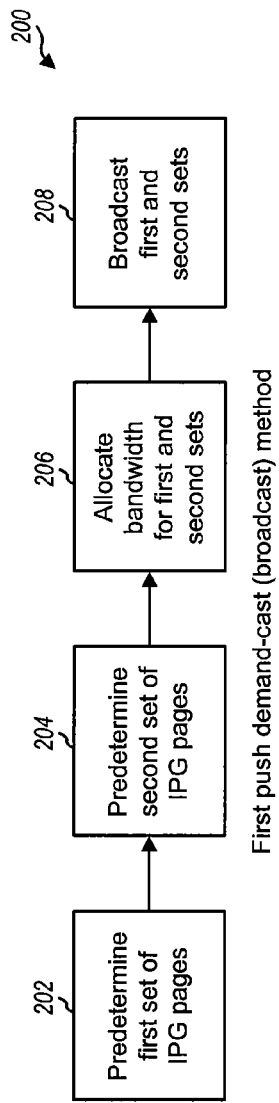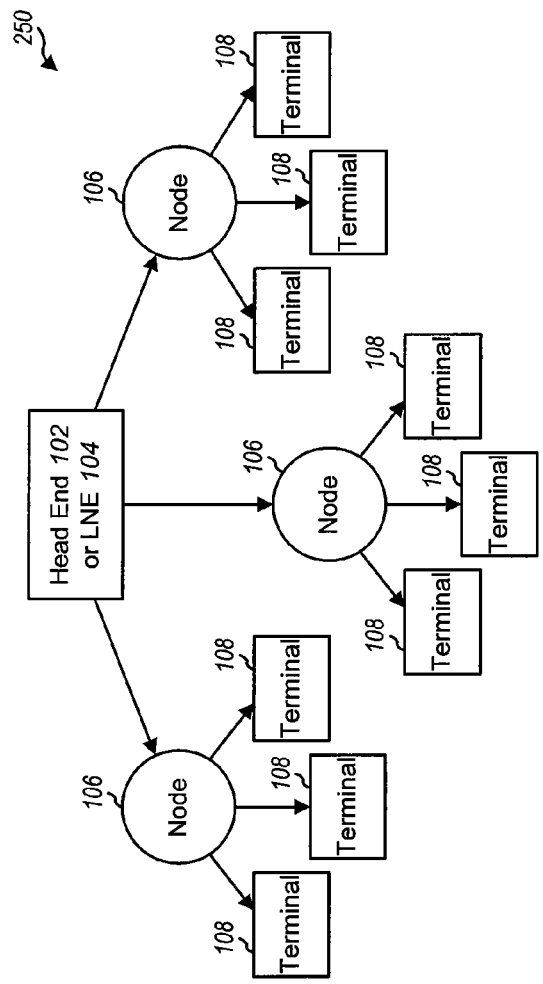

First pull demand-cast (pointcast) method

First pull demand-cast (pointcast) topology

Second pull demand-cast (narrowcast) method

Second pull demand-cast (narrowcast) topology

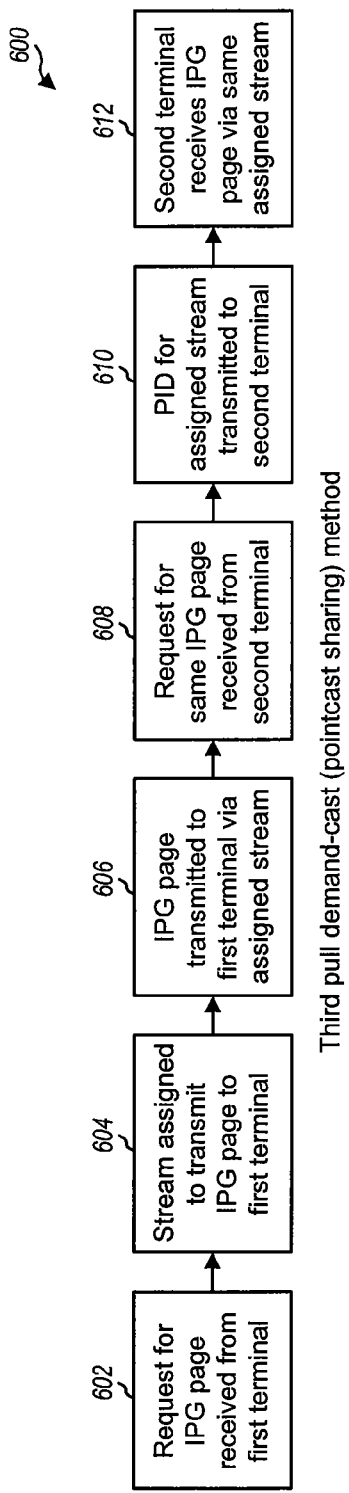
FIG. 6A — Third pull demand-cast (pointcast sharing) method
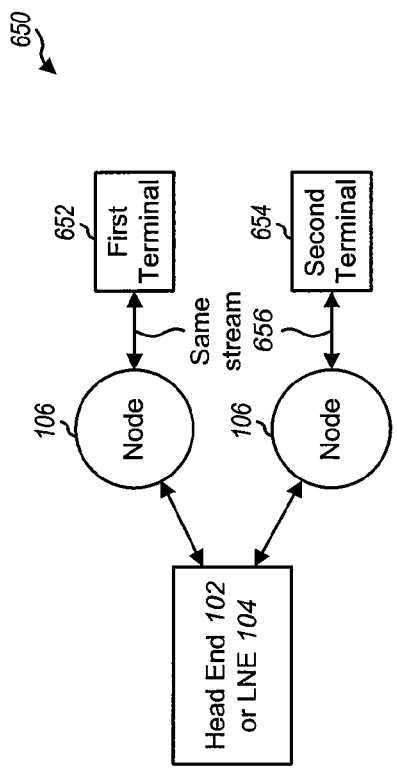
FIG. 6B — Third pull demand-cast (pointcast sharing) topology

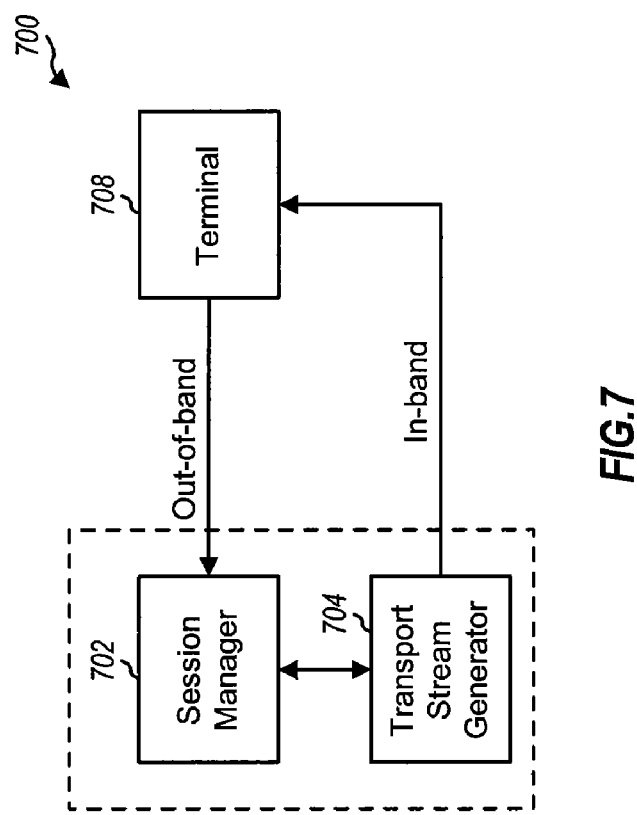

TSG-to-Terminal Communication:

Contents of Demand-Cast Index Table

| |
|---|
| table version number (incremented when table content changes) |
| list of available demand-cast streams |
| IP address for the source TSG |
| MUX channel number within the source TSG |
| time-of-day and day-of-week |

*FIG. 15A*

Terminal-to-SM Communication:

Message Content

| |
|---|
| demand-cast stream ID |
| terminal ID |
| IP address for the source TSG |
| MUX channel number within the source TSG |
| message information (acquisition, release, or request) |

*FIG. 15B*

SM to-TSG Communication:

Message Content

| demand-cast stream ID |
|---|
| MUX channel number within the source TSG |
| message/command (stream released, stream requested, or reset) |

*FIG. 15C*

TSG-to-SM Communication:

Message Content

| demand-cast stream ID |
|---|
| MUX channel number within the source TSG |
| IP address for the source TSG |
| acknowledgement (of stream release, of stream request, or of reset) |

*FIG. 15D*

| A | A | A | A | R | R | R | R |
|---|---|---|---|---|---|---|---|
| A | A | A | A | R | R | R | R |
| A | A | A | A | R | R | R | R |
| A | A | A | R | R | R | R | P |
| A | A | A | R | R | R | R | P |

"Active" demand-cast streams are in IPG multiplex.

A: "Acquired" streams are in MUX and in demand-cast index table.

R: "Released" streams are in MUX and in demand-cast index table. They can be turned into "passive" streams.

P: "Passive" streams are technically released. They are not in the demand-cast index table. They are removable.

TSG Demand-cast Stream Status

FIG. 16

MESSAGING PROTOCOL FOR INTERACTIVE DELIVERY SYSTEM

CROSS REFERENCE TO RELATED APPLICATION

This application is a divisional of U.S. patent application Ser. No. 09/708,809, filed Nov. 8, 2000, now U.S. Pat. No. 7,146,628 entitled MESSAGING PROTOCOL FOR INTERACTIVE DELIVERY SYSTEM, which application is incorporated herein by reference as if set forth in its entirety.

BACKGROUND OF THE INVENTION

The present invention relates to communications systems in general. More specifically, the invention relates to techniques to efficiently deliver interactive program guide (IPG) in a server-centric system.

Over the past few years, the television industry has seen a transformation in a variety of techniques by which its programming is distributed to consumers. Cable television systems are doubling or even tripling system bandwidth with the migration to hybrid fiber coax (HFC) cable plant. Customers unwilling to subscribe to local cable systems have switched in high numbers to direct broadcast satellite (DBS) systems. And, a variety of other approaches have been attempted focusing primarily on high bandwidth digital technologies, intelligent two-way set top terminals, or other methods of trying to offer service differentiated from standard cable and over-the-air broadcast systems.

With this increase in bandwidth, the number of programming choices has also increased. Leveraging off the availability of more intelligent set top terminals, several companies such as Starsight Telecast Inc. and TV Guide, Inc. have developed elaborate systems for providing an interactive listing of a vast array of channel offerings, expanded textual information about individual programs, and the ability to look forward to plan television viewing as much as several weeks in advance.

With this increase in the quantity of programming, it is a challenge to deliver program guide data to viewers in an efficient and effective manner. A large amount of resources (e.g., bandwidth) would normally be needed to continually transmit, for example, two weeks of programming for 200 channels. Therefore, efficient and effective techniques to deliver interactive program guide to a large number of viewers are highly desirable.

Moreover, the increased bandwidth has allowed service providers to offer various services such as regular programming, pay-per-view (PPV), video-on-demand (VOD), music channels, and so on. The large amount of programming offered by each of these services typically necessitates the use of a separate user interface especially adopted for the service. As more services are provided and the complexity of these services increases, the user interfaces becomes more complicated to implement and for users to navigate. Thus, an integrated user interface that supports these various services, especially interactive program guide (IPG) and VOD, are highly desirable.

SUMMARY OF THE INVENTION

The present invention provides messaging techniques that can be advantageously used to support an interactive program guide (IPG) delivery system. The IPG can be provided via a number of IPG pages, with each IPG page being defined with a number of regions (or portions). The non-redundant regions for the IPG pages can be encoded, and some of the encoded regions can be continually transmitted (i.e., broadcast) and some others can be transmitted as requested (i.e., demand-cast). To implement a bandwidth efficient demand-cast system, only the necessary regions not currently received at a terminal are requested (as oppose to entire pages), and the head-end transmits only the requested regions.

An aspect of the invention provides efficient messaging techniques to facilitate the IPG delivery scheme described above. These messaging techniques allow the terminals to specifically designate the requested items of information (i.e., the specific regions of interest).

An embodiment of the invention provides a method for requesting information for IPG, with the IPG being provided via a number of IPG pages and each IPG page including a number of defined regions (e.g., a guide region, a video region, and so on). In accordance with the method, selection for a particular region of a particular IPG page is received at a terminal and a determination is made whether the selected region is currently received at the terminal. If the selected region is not currently received, a request for the selected region is generated and sent to a server of an information distribution system. The selected region may be defined to be a guide region for a program listing if the selected IPG page is not currently received at the terminal.

The request can be generated based on a particular message format that includes a number of fields. In a specific implementation, the request for a guide region includes a region ID field that identifies the selected region, a subtype field that identifies a particular filter (if any) used to filter programs to be included in the program listing, a time slot field that identifies a specific time slot for the selected IPG page, and a page offset field that identifies a particular page from among a number of pages available for the selected time slot.

Other message formats can be defined for requests of other regions of the IPG page. For example, for picture-in-picture encoding scenarios, one of a number of video steams can be shown in the barker video region upon request from a set top terminal. In this case, the request for the video region may include the region ID that identifies the barker region, the subtype field that may be used to identify the type of video stream being requested, such as sports-related, kids-related, and the like, and time slot and page offset fields can be reserved to be used for future implementation purposes.

The invention further provides other methods and system elements (i.e., terminal and server) that implement various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

The teachings of the invention can be readily understood by considering the following detailed description in conjunction with the accompanying drawings.

FIGS. 2-6 are diagrams of various methods and topologies for demand-casting interactive program guide (IPG) pages in accordance with embodiments of the invention;

FIGS. 2A and 2B are respectively a flow diagram and a topology for a first push method for demand-casting IPG pages in accordance with an embodiment of the invention;

FIGS. 6A and 6B are respectively a flow diagram and a topology for a third pull method for demand-casting IPG pages in accordance with an embodiment of the invention;

FIG. 7 is a diagram of a two-way system for efficient delivery of demand-cast video sequences in accordance with an embodiment of the invention;

FIGS. 15A-15D are diagrams of an embodiment of the messaging between the terminal, the session manager, and the transport stream generator;

FIG. 16 is a diagram of an example showing the status of active demand-cast streams in an IPG multiplex;

To facilitate understanding, identical reference numerals have been used, where possible, to designate identical elements that are common within a figure.

DESCRIPTION OF THE SPECIFIC EMBODIMENTS

A. Illustrative Communications Network

Figure 1:
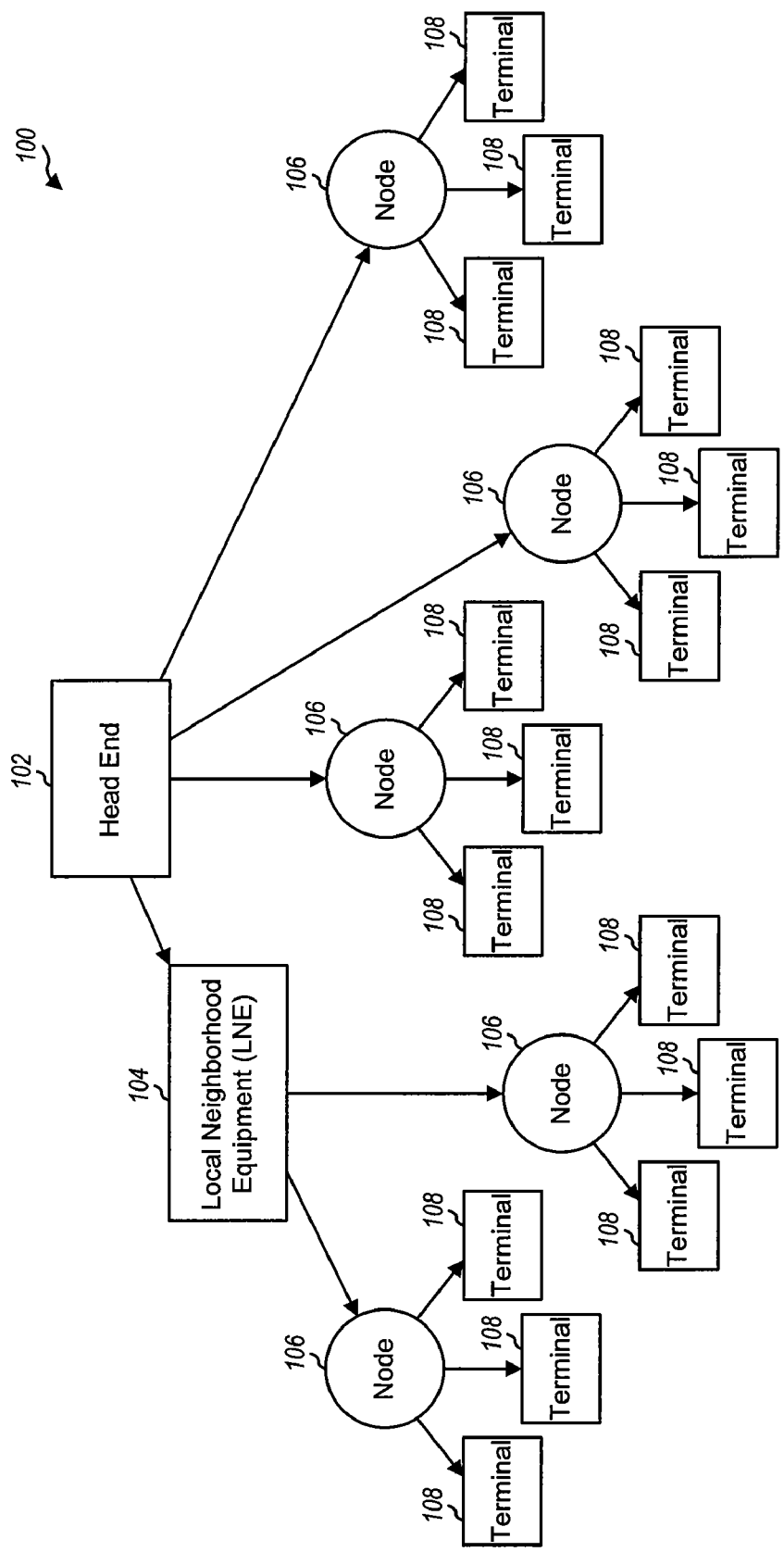
FIG. 1 is a diagram of an illustrative communications network for distributing video sequences to a number of terminals in accordance with an embodiment of the invention.

FIG. 1 is a diagram of an illustrative communications network 100 for distributing video sequences to a number of terminals in accordance with an embodiment of the invention. Communications network 100 may be a cable distribution network, but other types of distribution networks may also be used and are within the spirit and scope of the invention.

As shown in FIG. 1, communications network 100 includes one or more head-ends (HE) 102, one or more centers for local neighborhood equipment (LNE) 104, a number of distribution nodes 106, and a number of terminals 108. Local neighborhood equipment 104 may be located, for example, at remote hubs of a cable distribution network. Terminals 108 may be user terminals, interactive set-top terminals (STT), or other devices with interactive functionalities.

B. Example Methods and Topologies

As used herein, "demand-cast" refers to the process of managing and delivering content to one or more users in response to user demand for the content. "Broadcast" refers to the process of managing and delivering content to a number of users on a continual basis. "Pointcast" refers to the process of managing and delivering content to a particular user. And "Narrowcast" refers to the process of managing and delivering content to a group of users.

FIGS. 2-6 are diagrams of various methods and topologies for demand-casting interactive program guide (IPG) pages. These methods and topologies are presented for purposes of edification and are not meant to limit the scope of the invention.

1. First Push Method for Demand-cast

FIG. 2A is a flow diagram showing a first push method 200 for demand-casting IPG pages in accordance with an embodiment of the invention. As described below, method 200 includes four steps.

In a first step 202, a first set of IPG pages to be broadcast is predetermined. The first set of IPG pages may comprise video sequences, for example, for a current time period. For instance, if the current time is 1:07 pm, then the current time period may include programming from 1:00 pm to 2:30 pm, assuming a 90-minute time period.

In a second step 204, a second set of IPG pages to be broadcast is predetermined. The second set of IPG pages may comprise video sequences, for example, for a prime time period. Such prime time period is a time period during which a large number of viewers typically watch TV programming. For example, the prime time period may include programming from 6:00 pm to 9:00 pm.

In a third step 206, the bandwidth to broadcast the first and second sets of IPG pages is allocated by the distribution system for that purpose. For example, as described below in more detail, a bandwidth manager (BWM) within head-end 102 and/or local neighborhood equipment 104 allocates the necessary bandwidth within the in-band network to broadcast the first and second sets of IPG pages to the terminals. If the first and second sets overlap, then only the non-redundant video sequences need to be broadcast, and only enough bandwidth to broadcast the non-redundant video sequences needs to be allocated. Such situation may occur, for example, when the current time period overlaps the prime time period.

In a fourth step 208, the IPG pages of the first and second sets are broadcast to terminals 108 within the broadcast range. The broadcast range may comprise all terminals 108 downstream from head-end 102 or local neighborhood equipment 104. Only non-redundant content needs to be broadcast, and the broadcast is achieved within the allocated in-band bandwidth.

FIG. 2B depicts a first push topology 250 for demand-casting IPG pages in accordance with an embodiment of the invention. Topology 250 corresponds to the first push method 200 of FIG. 2A. As shown in FIG. 2B, the IPG pages are transmitted from head-end 102 or local neighborhood equipment 104 downstream within communications network 100. As shown in FIG. 2B, the broadcast is "pushed" from head-end 102 or local neighborhood equipment 104 to distribution nodes 106 and finally to a number of terminals 108.

2. Second Push Method for Demand-cast

Figure 3A:
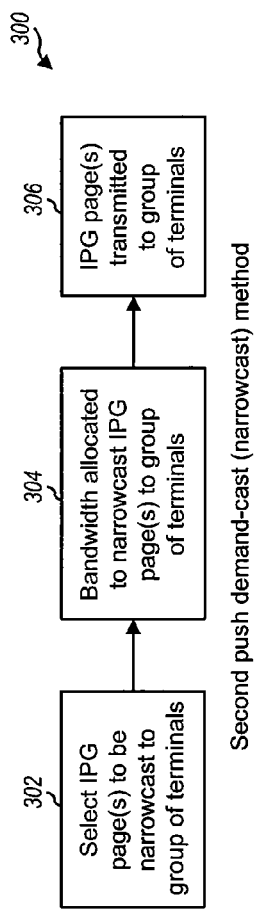
FIGS. 3A and 3B are respectively a flow diagram and a topology for a second push method for demand-casting IPG pages in accordance with an embodiment of the invention.

FIG. 3A is a flow diagram showing a second push method 300 for demand-casting IPG pages in accordance with an embodiment of the invention. As described below, method 300 includes three steps.

In a first step 302, one or more IPG pages are selected to be narrowcast to a group of terminals 352. For example, the group of terminals may be a group comprising a high concentration of users with a particular ethnicity or special interest, and the selected IPG page(s) may comprise programming targeted to that ethnic or special interest group. As another example, the group of terminals may comprise terminals in a school campus or business, and the selected IPG page(s) may comprise class instruction or other targeted material. The group of terminals may include terminals in one geographic area or terminals dispersed among different geographic areas but linked, for example, via a network group address.

In a second step 304, the bandwidth to narrowcast the selected IPG page(s) is allocated by the distribution system for that purpose. For example, as described below in more detail, the bandwidth manager (BWM) within head-end 102 and/or local neighborhood equipment 104 allocates the necessary bandwidth within the in-band network to narrowcast the selected IPG page(s) to the group of terminals. If the requested IPG page(s) are already being broadcast as shown in FIGS. 2A and 2B, then no additional bandwidth for a narrowcast needs be allocated.

In a third step 306, the selected IPG page(s) are narrowcast to the group of terminals. The narrowcast needs only to be received by terminals within the group of terminals 352 and does not need to be received by other terminals. The narrowcast is sent downstream from head-end 102 or local neighborhood equipment 104 to the group of terminals. The narrowcast is achieved within the allocated in-band bandwidth. If the requested IPG page(s) are already being broadcast as shown in FIGS. 2A and 2B, then the narrowcast needs not be performed.

Figure 3B:
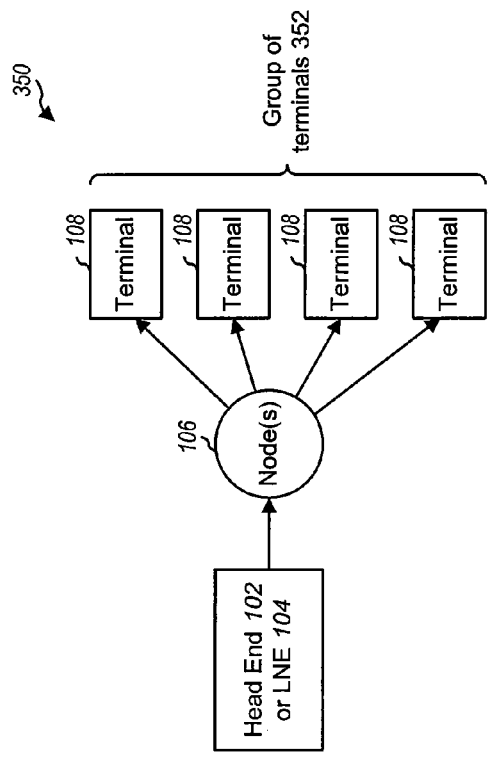

FIG. 3B depicts a second push topology 350 for demand-casting IPG pages in accordance with an embodiment of the invention. Topology 350 corresponds to the second push method 300 of FIG. 3A. As shown in FIG. 3B, the IPG page(s) are transmitted from head-end 102 or local neighborhood equipment 104 downstream within communications network 100. As shown in FIG. 3B, the narrowcast is pushed from head-end 102 or local neighborhood equipment 104 to one or more distribution nodes 106 and finally to the terminals within group of terminals 352.

3. First Pull Method for Demand-cast

Figure 4A:
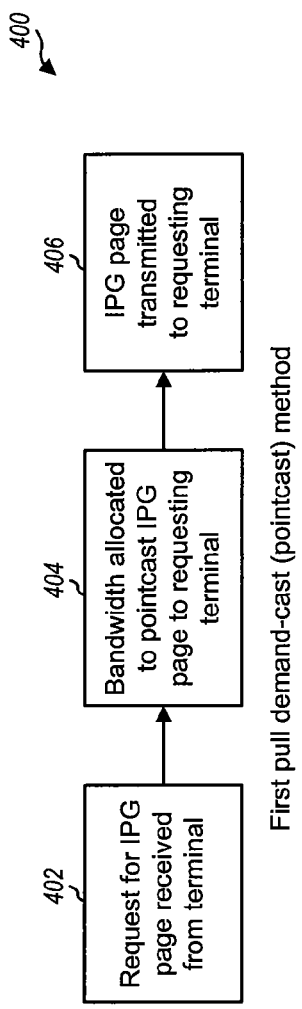
FIGS. 4A and 4B are respectively a flow diagram and a topology for a first pull method for demand-casting IPG pages in accordance with an embodiment of the invention.

FIG. 4A is a flow diagram showing a first pull method 400 for demand-casting IPG pages in accordance with an embodiment of the invention. As described below, method 400 includes three steps.

In a first step 402, a request for an IPG page is received from a terminal 108. The request is transmitted upstream from terminal 108 to head-end 102 or local neighborhood equipment 104 via communications network 100. The upstream transmission may be achieved via an out-of-band network or, alternatively, via an in-band network. Such request from the requesting terminal may comprise, for example, a look-ahead request for programming for a time period ahead of the current time period. For a system where one or more IPG pages are already broadcast as shown in FIGS. 2A and 2B, the requesting terminal may first check to see whether or not the requested IPG page is already being broadcast before transmitting the request upstream.

In a second step 404, the bandwidth to pointcast the requested IPG page is allocated by the distribution system for that purpose. For example, as described in more detail below, the bandwidth manager within head-end 102 and/or local neighborhood equipment 104 may allocate the necessary bandwidth within the in-band network to pointcast the requested IPG page to the requesting terminal. The allocation is performed if sufficient system resources are available to establish a pointcast session. Moreover, if the requested IPG page is already being broadcast as shown in FIGS. 2A and 2B, then no additional bandwidth for a pointcast needs be allocated.

In a third step 406, the requested IPG page is pointcast to the requesting terminal. The pointcast needs only to be received by the requesting terminal and does not need to be received by other terminals. The pointcast is sent downstream from head-end 102 or local neighborhood equipment 104 to the requesting terminal. The pointcast, if necessary, is achieved within the allocated in-band bandwidth. If the requested IPG page is already being broadcast as shown in FIGS. 2A and 2B, then the pointcast needs not be performed.

Figure 4B:
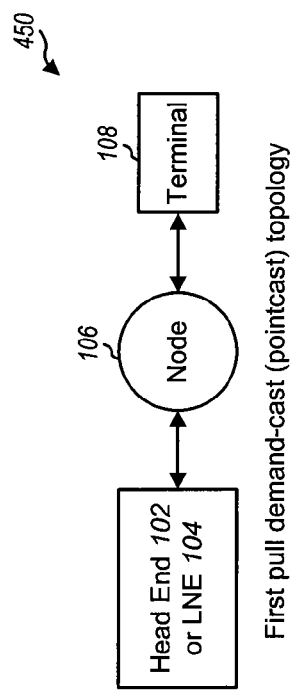

FIG. 4B depicts a first pull topology 450 for demand-casting IPG pages in accordance with an embodiment of the invention. Topology 450 corresponds to first pull method 400 shown in FIG. 4A. As shown in FIG. 4B, the request is transmitted upstream from the requesting terminal 108 to head-end 102 or local neighborhood equipment 104 via communications network 100. Subsequently, the requested IPG page is pointcast downstream from head-end 102 or local neighborhood equipment 104 to the requesting terminal via communications network 100.

4. Second Pull Method for Demand-cast

Figure 5A:
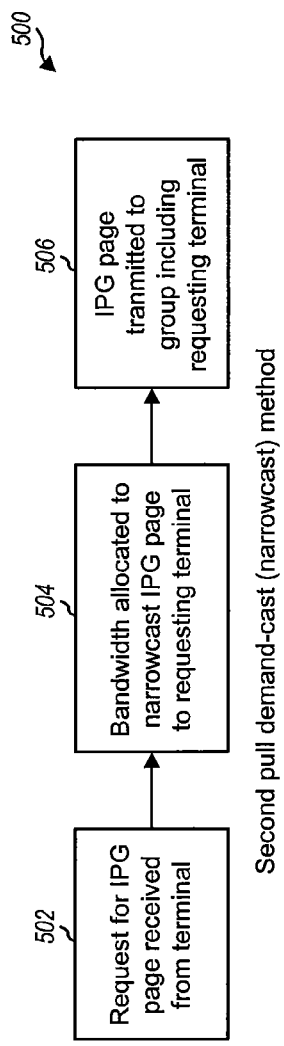
FIGS. 5A and 5B are respectively a flow diagram and a topology for a second pull method for demand-casting IPG pages in accordance with an embodiment of the invention.

FIG. 5A is a flow diagram showing a second pull method 500 for demand-casting IPG pages in accordance with an embodiment of the invention. As described below, method 500 includes three steps.

In a first step 502, a request for an IPG page is received from a requesting terminal 552. The request is transmitted upstream from requesting terminal 552 to head-end 102 or local neighborhood equipment 104 via communications network 100. The upstream transmission may be achieved via an out-of-band network or, alternatively, via an in-band network. Such request may comprise, for example, a look-ahead request for special interest programming available for a future time period ahead of the current time period. For a system where a set or sets of IPG pages are already being broadcast as shown in FIGS. 2A and 2B, requesting terminal 552 may first check to determine whether or not the requested IPG page is already being broadcast before transmitting the request upstream.

In a second step 504, the bandwidth to narrowcast the requested IPG page is allocated by the distribution system for that purpose. For example, as described below in relation to FIGS. 7 and 8, the bandwidth manager within head-end 102 and/or local neighborhood equipment 104 may allocate the necessary bandwidth within the in-band network to narrowcast the requested IPG page to a group of terminals 554 that includes requesting terminal 552. The allocation is performed if sufficient system resources are available to establish a narrowcast session. If the requested IPG page is already being broadcast as shown in FIGS. 2A and 2B, then no additional bandwidth for a pointcast needs to be allocated. The group of terminals 554 may include terminals in one geographic area or terminals dispersed among different geographic areas but linked, for example, via a network group address.

In a third step 506, the requested IPG page is narrowcast to group of terminals 554. The narrowcast needs only to be received by the terminals within group of terminals 554 and does not need to be received by other terminals. The narrowcast is sent downstream from head-end 102 or local neighborhood equipment 104 to group of terminals 554. The narrowcast is achieved within the allocated in-band bandwidth. If the requested IPG page is already being broadcast as shown in FIGS. 2A and 2B, then the narrowcast needs not be performed.

Figure 5B:
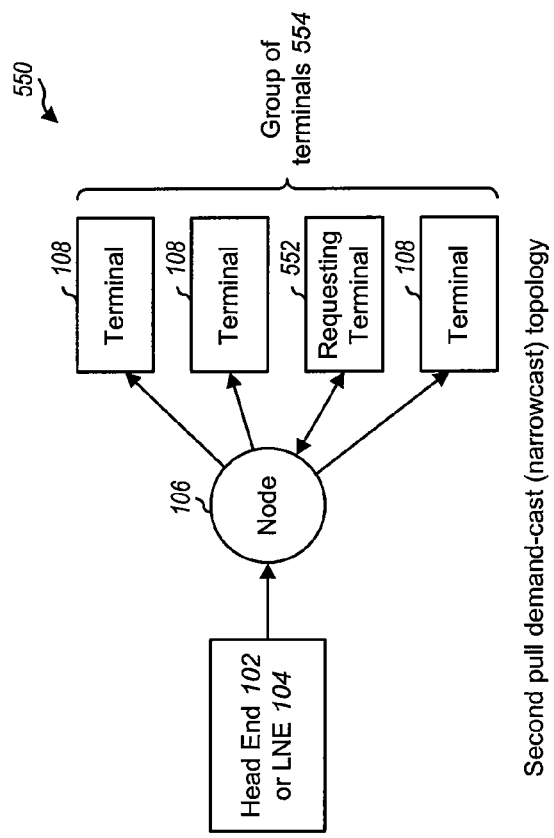

FIG. 5B depicts a second pull topology 550 for demand-casting IPG pages in accordance with an embodiment of the invention. Topology 550 corresponds to second pull method 500 shown in FIG. 5A. As shown in FIG. 5B, the request is transmitted upstream from requesting terminal 552 to head-end 102 or local neighborhood equipment 104 via communications network 100. Subsequently, the requested IPG page is narrowcast downstream from head-end 102 or local neighborhood equipment 104 to group of terminals 554, which includes requesting terminal 552, via communications network 100.

5. Third Pull Method for Demand-cast

FIG. 6A is a flow diagram showing a third pull method 600 for demand-casting IPG pages in accordance with an embodiment of the invention. As described below, method 600 includes six steps.

In a first step 602, a request for an IPG page is received from a first terminal 652. The request is transmitted upstream from first terminal 652 to head-end 102 or local neighborhood equipment 104 via communications network 100. The upstream transmission may be achieved via an out-of-band network or, alternatively, via an in-band network. Such request from first terminal 652 may comprise, for example, a look-ahead request for programming for a future time period ahead of the current time period. For a system where one or more IPG pages are already being broadcast as shown in FIGS. 2A and 2B, first terminal 652 may first check to see whether or not the requested IPG page is already being broadcast before transmitting the request upstream.

In a second step 604, a stream 656 may be assigned by the distribution system to pointcast the requested IPG page. The assignment is performed if sufficient system resources are available to establish a pointcast session. For example, as described below in more detail, the bandwidth manager within head-end 102 and/or local neighborhood equipment 104 may determine that sufficient resources are available to assign stream 656 to pointcast the requested IPG page to first terminal 652. The stream assignment may be achieved, for example, by assigning a particular value to the program identifier (PID) for stream 656. If the requested IPG page is already being broadcast as shown in FIGS. 2A and 2B, then stream 656 needs not be assigned.

In a third step 606, the requested IPG page is pointcast to first terminal 652 via assigned stream 656. This may be achieved by transmitting packets that are identified by the particular PID value and contain a video sequence of the requested IPG page. The pointcast needs only to be received by first terminal 652 and does not need to be received by other terminals. The pointcast is sent downstream from head-end 102 or local neighborhood equipment 104 to first terminal 652. If the requested IPG page is already being broadcast as shown in FIGS. 2A and 2B, then the pointcast needs not be performed.

In a fourth step 608, a request for an IPG page is received from a second terminal 654. In this example, the IPG page requested by second terminal 654 is the same as the IPG page requested by first terminal 652. Similar to the first request, the second request is transmitted upstream from second terminal 654 to head-end 102 or local neighborhood equipment 104 via communications network 100 via an out-of-band network or an in-band network. Second terminal 654 may be in the same or different geographic area as first terminal 652.

In a fifth step 610, the identifier (e.g., PID value) for the assigned stream 656 is transmitted from head-end 102 or local neighborhood equipment 104 to second terminal 654. This enables the next step 612 to occur without use of additional PIDs or additional network bandwidth.

And in a sixth step 612, second terminal 654 receives the requested IPG page via the same assigned stream 656, which was used to deliver the IPG page to first terminal 652. Second terminal 654 may be set to decode and present packets that are identified by the particular PID value for stream 656. Such packets contain the video sequence of the requested IPG page. In this manner, "sharing" of stream 656 occurs, changing the previous "single" pointcast to a "double" pointcast.

Similarly, other terminals may "share" the pointcast if they request the same IPG page and can receive the requested IPG page via the same stream 656. In this manner, any number of terminals may share the pointcast. This sharing results in more efficient use of the available bandwidth.

FIG. 6B depicts a third pull topology 650 for demand-casting IPG pages in accordance with an embodiment of the invention. Topology 650 corresponds to pointcast "sharing" method 600 shown in FIG. 6A. As shown in FIG. 6B, a request is transmitted upstream from first terminal 652 to head-end 102 or local neighborhood equipment 104 via communications network 100. In response, the requested IPG page is pointcast by stream 656 from head-end 102 or local neighborhood equipment 104 to first terminal 652. Next, a second request for the same IPG page is transmitted upstream from second terminal 654 to head-end 102 or local neighborhood equipment 104 via communications network 100. In response, the identifier for stream 656 is transmitted from head-end 102 or local neighborhood equipment 104 to second terminal 654. Subsequently, second terminal 654 uses the identifier to receive the IPG page from the same stream 656.

Figure 6C:
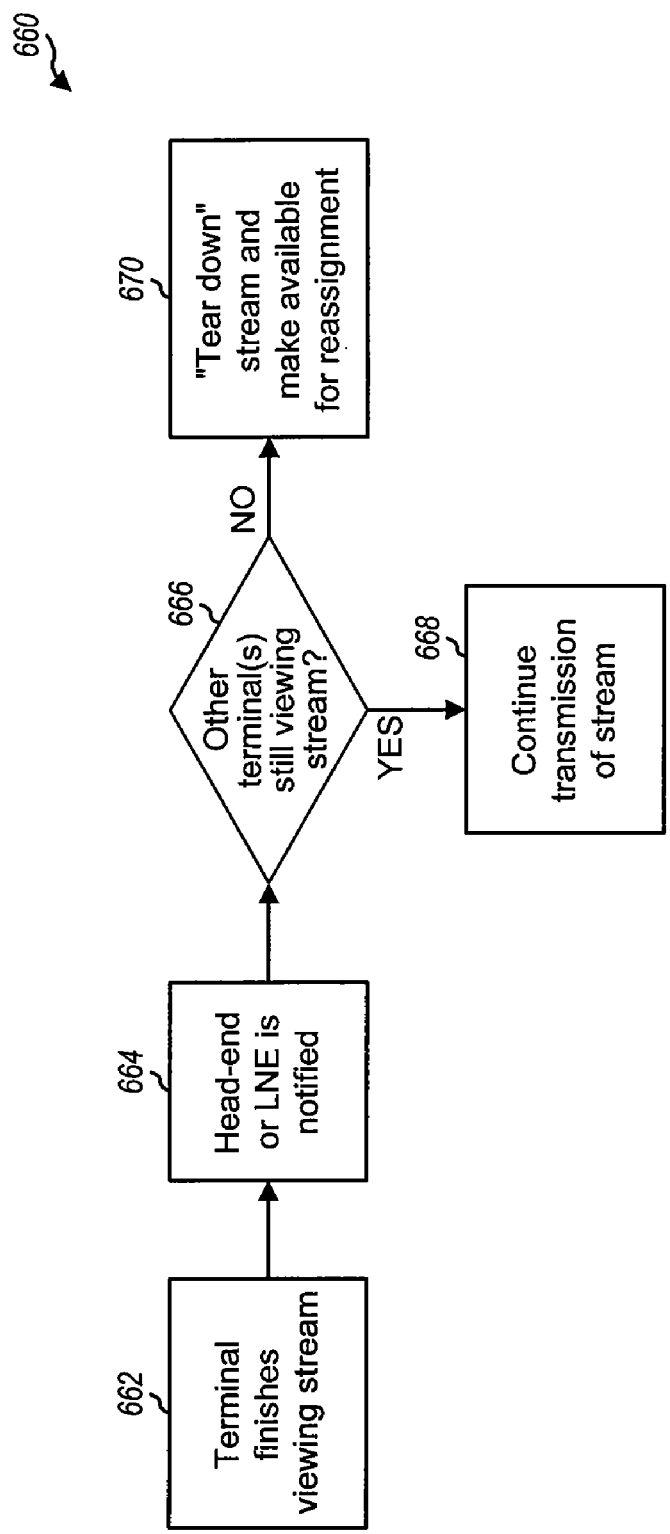
FIG. 6C is a flow diagram showing a method for terminating (or continuing) demand-casts in accordance with the third pull method.

FIG. 6C is a flow diagram showing a method 660 for terminating (or continuing) demand-casts in accordance with third pull method 600. As described below, method 660 includes five steps.

In a first step 662, a terminal finishes viewing a stream used to send an IPG page. In the example described above in FIGS. 6A and 6B, the terminal may be either first terminal 652 or second terminal 654. In general, the terminal may be any of the terminals that are sharing the same stream, or the last terminal to view a stream that was previously shared.

In a second step 664, head-end 102 or local neighborhood equipment 104 is notified that the terminal has finished viewing the stream. Such notification can be achieved by the terminal by sending a communication upstream to head-end 102 or local neighborhood equipment 104 via an out-of-band or in-band network.

In a third step 666, a determination is made whether or not that stream is being viewed by one or more terminals. As described in more detail below, this determination is done within head-end 102 or local neighborhood equipment 104 and may be done by a bandwidth manager in conjunction with a session manager.

In a fourth step 668, if one or more terminals are still viewing that stream, then head-end 102 or local neighborhood equipment 104 continues to transmit the stream. Such transmission is typically performed by an in-band delivery system.

Finally, in a fifth step 670, if no other terminals are viewing that stream, then the stream is "torn down" so that it is no longer transmitted and no longer takes up network bandwidth. The torn-down stream is then available for reassignment and the bandwidth can be reused to transmit a different pointcast, narrowcast, or broadcast.

C. Demand-Cast system

1. Guide Page Usage Frequency Distribution

The usage of guide pages can be characterized by their frequency distribution. Certain pages in a guide page matrix, such as those in the current time slot and adjacent time slots ("near look-ahead") are likely to be accessed more frequently by viewers. Other guide pages, such as the "far look-ahead" pages, are likely to be accessed less frequently. These characteristics of guide page usage can be supported by a demand-cast model described herein. Access to all possible guide pages in the guide page matrix can be achieved by sending in a transport stream a combination of continually broadcast guide pages for pages that are more frequently accessed, and temporarily broadcast or demand-cast guide pages for pages less frequently accessed. In an embodiment, current and near look-ahead pages are sent in a broadcast fashion and far look-ahead pages are sent in a demand-cast fashion.

2. Demand-cast Overview

A demand-cast IPG system is a two-way system employing communication between the terminal in the communications network and the head-end via a back-channel. Demand-cast pages are inserted in the transport stream for temporary broadcast in response to access demand generated by viewers in the network. When a particular viewer requests a particular guide page, one of two things can occur. If the requested page is already in the IPG broadcast, the terminal simply acquires the corresponding stream. Otherwise, if the page is not in the broadcast, the terminal requests the head-end to insert a stream in the IPG multiplex for the requested page. The head-end can then replace the least frequently accessed and not currently accessed stream in the IPG multiplex with a stream for the newly requested page.

When a terminal no longer accesses a guide page, it informs the head-end that it has released it. When accessing a demand-cast page, an IPG application at the terminal can "time-out" following a certain period of inactivity (e.g., 2 minutes) by the viewer. If a time-out occurs, the terminal can inform the head-end that it has released the page. Informing the head-end when demand-cast pages are released ensures that non-accessed demand-cast pages are available for substitution. If a terminal requests a new demand-cast page to be inserted into the IPG multiplex and there is no slot available in the IPG multiplex, the head-end refuses to insert a stream for the newly requested guide page, which then results in a blockage. Most statistical multiplexed systems are susceptible to blockage if loaded with an excessive number of users and during chaotic episodes. An advantage of the demand-cast model is that if a particular page is likely to be extensively accessed, such as a page listing a major sports event, the page only needs to be inserted once into the transport stream. The page is then readily accessible by any number of terminals without consuming additional bandwidth.

3. Latency in Broadcast vs. Demand-cast

Access to guide pages within a short delay (i.e., with low latency) is an important feature for interactive program guide. Continually broadcast pages offer a low latency access, whereas demand-cast pages may incur additional processing delays if not yet included in the transport stream. In an embodiment, frequently accessed pages, such as those in the current time slot and near look-ahead time slots, and perhaps prime-time slots, are broadcast continually so that they can be accessed with the lowest possible latency. Less frequently accessed far look-ahead pages can be sent via demand-cast.

4. System Description

FIG. 7 is a diagram of a two-way system 700 that can efficiently deliver demand-cast video sequences in accordance with an embodiment of the invention. System 700 includes a session manager (SM) 702 and a transport stream generator (TSG) 704.

Session manager 702 and transport stream generator 704 may be co-located within a distribution center. The distribution center may comprise, for example, head-end 102 in communications network 100. Alternatively, session manager 702 and transport stream generator 704 may be at different locations. For example, session manager 702 may be located at head-end 102, and transport stream generator 704 may be located at local neighborhood equipment 104 in communications system 100.

Session manager 702 and transport stream generator 704 are both coupled to a number of terminals 708 via a distribution network. The distribution network may comprise, for example, a cable distribution network as illustrated in FIG. 1. In that example, terminals 708 would comprise terminals 108 or an equivalent functionality integrated into a computer system or advanced television. Alternatively, for example, the distribution network may comprise a satellite communications system or another type of communications system (telephonic, wireless, etc.).

One terminal 708 and its links to session manager 702 and transport stream generator 704 are illustrated in FIG. 7. In the specific embodiment shown in FIG. 7, terminal 708 receives in-band communication from transport stream generator 704 and sends out-of-band (OOB) communications to session manager 702. In an alternative embodiment, the communication to session manager 702 may comprise upstream in-band communications.

Session manager 702 may comprise, in one embodiment, a computer system residing at head-end 102. The computer system may comprise, for example, a computer server running a particular operating system (e.g., a version of the UNIX or Windows operating system). The computer system may receive out-of-band communication from terminals 708 via a connection to the network controller. For example, the connection may comprise an Ethernet connection, and the network controller may comprise a controller from General Instruments Corp (now part of Motorola Inc.) or another supplier. The computer system also communicates with and controls transport stream generator 704 via a network connection such as an Ethernet connection.

Session manager 702 manages delivery of IPG pages to terminals 708 on a number of cable nodes, with each node being served by a separate IPG multiplexed transport stream generated at a corresponding transport stream generator 704. Session manager 702 also monitors demand-cast stream usage by terminals 708. Session manager 702 tracks IPG demand-cast streams that are acquired by at least one terminal 708. For example, session manager 702 can maintain a table that dynamically lists which terminals 708 are using each stream. This tracking is performed for each IPG multiplexed transport stream managed by session manager 702.

Session manager 702 also accepts messages from terminals 708 indicating that they have acquired, released, or requested demand-cast streams. A new terminal 708 that has acquired a demand-cast stream is registered (i.e., added) to the stream, and a terminal 708 that has released a demand-cast stream is removed from the registry for the stream. Session manager 702 informs the corresponding transport stream generator 704 if there is no longer any terminals 708 registered to a particular demand-cast stream, and also informs transport stream generator 704 when a terminal 708 requests a demand-cast stream. In one embodiment, session manager 702 may time-out acquisition of a stream by any terminal 708 if the terminal has not released the stream within a particular period of time (e.g., a few minutes). The time-out may be implemented by removing terminals 708 from the registry for the stream after the particular period of time.

Transport stream generator 704 may comprise, in one embodiment, a computer system residing at head-end 102. The computer system may comprise, for example, a computer server running a particular operating system (e.g., a version of Windows or UNIX operating system). Alternatively, transport stream generator 704 may be located apart from session manager 702, for example, at local neighborhood equipment 104. Each transport stream generator 704 is coupled to an associated session manager 702, for example, via an Ethernet network. Transport stream generator 704 may generate one or more IPG multiplexed transport streams, with each transport stream being broadcast to a respective node in the distribution system.

In one embodiment, the IPG multiplexed transport stream comprises an MPEG transport stream. In this case, transport stream generator 704 may communicate with terminals 708 via tables in the private section of the MPEG transport stream. Such table may include a list of available demand-cast streams, along with the address of the source transport stream generator 704 and information to identify the particular IPG multiplexed transport stream to which the table belongs.

Transport stream generator 704 manages each IPG multiplexed transport stream that it generates. Transport stream generator 704 receives information from session manager 702 indicating whether each demand-cast stream being served is currently being acquired by any terminal, or not at all. That is, transport stream generator 704 is informed by session manager 702 when a demand-cast stream is no longer being acquired by any terminals 708.

In one embodiment, transport stream generator 704 maintains a status for each demand-cast stream being served. The status for each stream is adjusted upon receipt by transport stream generator 704 of certain messages from session manager 702. In an embodiment, the basic states for the stream status comprise an "acquired" state that denotes that the demand-cast stream is being acquired by one or more terminals 708, and a "released" state that denotes that the demand-cast stream is not being acquired by any terminal 708. Transport stream generator 704 continues to serve "acquired" demand-cast streams by multiplexing them into the appropriate transport streams and replaces "released" demand-cast streams with new demand-cast streams upon receipt of request messages from session manager 702. In an embodiment, transport stream generator 704 also keeps track of the order in which the streams are released, so that the oldest released stream may be used as the most likely candidate for replacement.

If all demand-cast streams in a particular IPG multiplexed transport stream are "acquired," then a new stream may not be inserted into the transport stream, and transport stream generator 704 may refuse any new requests. In such case, a message indicating such refusal may be sent to session manager 702 and/or the requesting terminal 708.

In an embodiment, terminal 708 comprises a set-top terminal (STT) for use by a service subscriber. The STT may comprise an embedded system that includes a tuner, a demultiplexer, and a decoder, as described in further detail below. The STT drives the subscriber's display unit or TV set, and it may be coupled to transport stream generator 704 via an RF feed from a cable distribution network. The IPG pages may be received from a particular IPG multiplexed transport stream on a particular modulated carrier signal. In an embodiment, the IPG multiplexed transport stream may comprise an ensemble of elementary MPEG video streams, with each elementary stream representing a portion of the guide.

In an embodiment, terminal 708 includes IPG client software application that resides at the terminal. The IPG client application is responsible for presenting the IPG to the viewer, and demultiplexes and decodes IPG pages requested by the user. If a requested page is already being received via the IPG multiplexed transport stream, then the IPG client application acquires the stream immediately and sends a message to session manager 702 indicating that it has acquired the stream. And if the requested page is not in the IPG multiplexed transport stream, then the IPG client application sends a request message to session manager 702. Subsequently, the IPG client application acquires the stream once it is transmitted by transport stream generator 704 and received by terminal 708. In addition, if a stream is no longer being acquired, the IPG client application sends a release message to session manager 702. In an embodiment, if there is no remote control or other activity by the user for a particular period of time (e.g., a few minutes), then the IPG client application times-out the acquisition. The time-out may be accomplished, for example, by sending a release message to session manager 702 and acquiring a broadcast stream instead.

D. Major Modules of Demand-cast System

The demand-cast system includes three major subsystems: the set top terminal (STT), the session manager (SM), and the transport stream generator (TSG). For a better understanding of the invention, a specific implementation of each subsystem is now described. Other implementations are also possible and within the scope of the invention.

1. Set-top Terminal (STT)

The STT is the end-user or cable service subscriber tuner/demultiplexer/decoder and embedded system. In an embodiment, the STT used in initial pilot deployments of the demand-cast system is the General Instruments DCT-2000. The STT is coupled to the cable operator RF feed and drives the subscriber's display unit or TV set. The IPG content is provided in an IPG transport stream (i.e., IPG multiplex) located on a specific QAM carrier. The IPG multiplex contains an ensemble of elementary MPEG video streams, with each elementary video stream representing portions of the guide and some of these streams representing guide grid pages. The STT receives messages from the head-end via tables in the private section of the IPG transport stream (in-band messaging.) The STT sends messages to the head-end via an out-of-band back-channel or return path.

The STT includes an IPG application that is responsible for presenting (e.g., the DIVA Interactive Program Guide) to the viewer. The IPG application demultiplexes and decodes IPG pages requested by the user. If a particular page is in the IPG transport stream, the STT can quickly acquire the stream and inform the session manager that it has requested the page. And if the page is not in the IPG multiplex, the STT also sends a message to the session manager that it has requested it. The STT then acquires the stream once the stream is included in the IPG multiplex. When the STT no longer acquires a particular guide stream, it informs the session manager that it has released the stream.

In an embodiment, if the STT is on a particular demand-cast stream for more than a particular period of time (e.g., 2 minutes) without any remote control activity, the STT times-out. The STT then acquires a broadcast stream instead and informs the session manager that it has released the demand-cast stream.

2. Session Manager (SM)

In an embodiment, the session manager is implemented with a computer system (e.g., a SPARC Station running the Solaris operating system from SunMicrosystems, Inc.) residing at the cable head-end. The session manager is coupled via Ethernet to the server side of a network controller (NC) from General Instruments Corp. and is the receiver of out-of-band return path messages originating from the STTs. The session manager can handle STTs on multiple cable nodes, each node being served by a separate IPG multiplex. The session manager communicates with and controls the transport stream generators via Ethernet. The transport stream generators generate the IPG transport streams.

The session manager manages one or more cable networks and monitors demand-cast stream usage. The session manager also tracks IPG demand-cast streams that are acquired by at least one STT and maintains a dynamic list of STTs that are using each demand-cast stream. This tracking is achieved for each IPG multiplex managed by the session manager. The session manager accepts messages from the STTs indicating requests for, or release of, demand-cast streams. An STT that has acquired a demand-cast stream is registered to the stream, and an STT that has released a demand-cast stream is removed from the stream's registry. The session manager informs the transport stream generator if there are no longer any STTs using a particular demand-cast stream, and also informs the transport stream generator when an STT requests a demand-cast stream.

In an embodiment, the session manager times-out an STT from a demand-cast stream if the STT has not released the stream within a particular time period (e.g., a few minutes). The session manager can achieve this by removing the STT from the demand-cast stream's registry.

3. Transport Stream Generator (TSG)

In an embodiment, the transport stream generator is implemented with a computer system (e.g., running a WindowNT operating system from Microsoft Corp.) residing at the cable head-end. The transport stream generator is coupled via Ethernet to the session manager controlling it. The transport stream generator produces one or more IPG transport streams, with each transport stream being broadcast to a respective node. In an embodiment, the transport stream generator communicates with the STTs via tables in the private section of the IPG transport streams. The table contains a list of the available demand-cast streams along with the IP address of the source transport stream generator (e.g., its IP address) and the channel number of the IPG multiplex (i.e., which multiplex it is in the transport stream generator).

The transport stream generator manages the transport stream for each IPG multiplex it generates. The transport stream generator receives information from the session manager for each demand-cast stream indicating whether the stream is currently acquired by any STT or released by all STTs. The transport stream generator is informed by the session manager when there is no longer any STT on a particular demand-cast stream and when an STT requests a demand-cast stream.

The transport stream generator maintains the status for all demand-cast streams in each IPG multiplex. The transport stream generator adjusts the status for each demand-cast stream each time it receives a message from the session manager for the stream. The basic status for each stream includes "acquired" for a stream that is in use by one or more STTs and "released" for a stream that is not in use by any STT. The transport stream generator continues to send "acquired" streams in its IPG multiplexes and replaces "released" streams with new demand-cast streams as they are requested. The transport stream generator also keeps track of the age of the released streams and the best candidate for replacement is the oldest released stream. If all demand-cast streams in a multiplex are "acquired" then it may not be possible to insert a new stream when requested and the transport stream generator can refuse to process the request.

E. Example of Interactive Program Guide

An embodiment of an interactive program guide in accordance with the invention is described below. The embodiment is described for purposes of illustration and is not meant to limit the scope of the invention.

Figure 8:
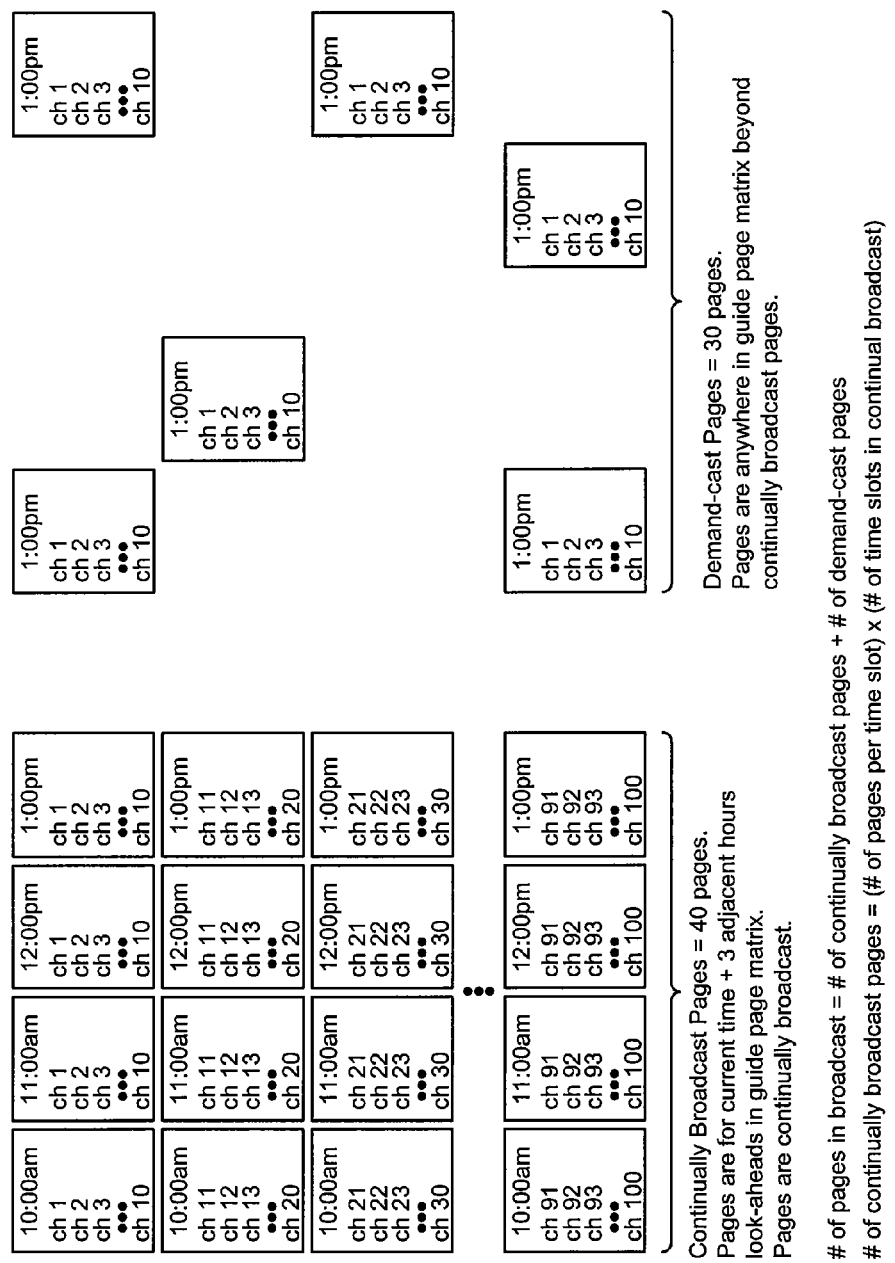
FIG. 8 depicts an example of a set of IPG pages for continual broadcast and other IPG pages for demand-cast in accordance with an embodiment of the invention.

FIG. 8 depicts an example of a set of IPG pages for continual broadcast and other IPG pages for variable demand-cast in accordance with an embodiment of the invention. In the specific example shown in FIG. 8, 40 IPG pages are continually broadcast and up to 30 IPG pages may be variably demand-cast. There are 10 guide pages per time slot, and the continual broadcast includes 10 guide pages for the current time slot and 30 guide pages for the next three 1-hour time slots. The variably demand-cast pages may be any pages within the guide page matrix that are not currently being broadcast.

In such a system, when a request for a guide page is made by a particular terminal, either one of two scenarios can occur. First, if the page is already in the IPG broadcast, then the terminal simply acquires the stream for the page from the IPG broadcast. Alternatively, if the page is not in the broadcast, then the terminal transmits a request for the page to the head-end. The head-end may then fulfill the request by replacing the currently transmitted stream that is least frequently accessed and not currently accessed with another stream containing the requested page.

Subsequently, the terminal eventually ends its access to the guide page. This may occur because the user has instructed the terminal to view a different page. Alternatively, this may occur because of a time-out due to inactivity over a particular period of time (e.g., 2 minutes). In any case, if the terminal is no longer accessing the guide page, then the terminal transmits a message to the head-end indicating that it has released the corresponding stream. Informing the head-end when demand-cast pages become released ensures that non-accessed demand-cast pages become available for substitution, as described above.

An advantage of the invention is that, if a particular page is extensively accessed (such as a page listing a major sports event), then the system needs to insert the particular page only once into the transport stream. Once inserted, the page is readily accessible by any number of terminals without requiring additional bandwidth. Other systems may be more susceptible to blockage, which occurs, for example, when a newly requested page cannot be inserted into the transport stream because no bandwidth is available within the transport stream.

An IPG delivery system in accordance with an embodiment of the invention is a two-way system that is capable of supporting two-way communication between the terminals on the cable network and the equipment in the cable head-end. For example, communication may be transmitted from the terminals to the head-end via a back-channel, and content may be transmitted from the head-end to the terminals by insertion into a transport stream.

Figure 9:
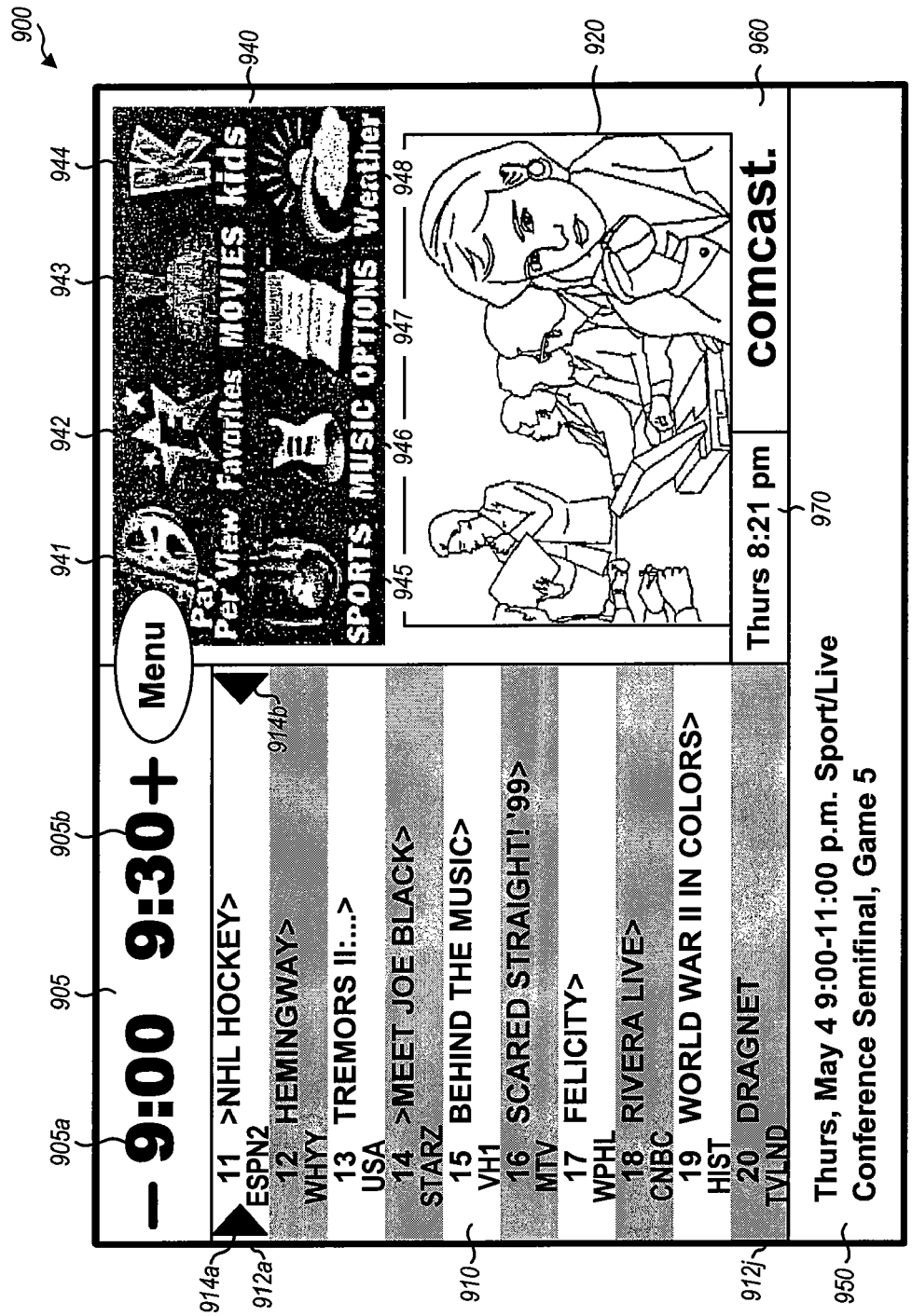
FIG. 9 is an example of one picture taken from a video sequence that can be encoded using the invention.

FIG. 9 depicts an example of an IPG page 900 in accordance with an embodiment of the invention. In the specific embodiment shown in FIG. 9, IPG page 900 includes a time slot region 905, a guide region 910, a video region 920, an icon region 940, a program description region 950, a logo region 960, and a date/time display 970. Other designs for the IPG page with different layouts, configurations, and combinations of regions and objects can be contemplated and are within the scope of the invention.

Time slot region 905 includes a first time slot object 905a and a second time slot object 905b that indicate the time slots for which program guide is being provided on the IPG page. Guide region 910 is used to display program listings for a group of channels. In the embodiment shown in FIG. 9, the program listings show the available programming in two half-hour time slots. Guide region 910 thus includes a number of channel objects 912a through 912j used to display channel information for a guide listing of channels. Guide region 910 further includes a pair of channel indicator icons 914a and 914b that identifies the current cursor location.

Program description region 950 is used to present descriptive information relating to a particular program selected from the program listings, or may be used to show other information. Video region 920 may be used to display images, videos, text, or a combination thereof, which may be used for advertisements, previews, or other purposes. Video region 920 may be implemented as described above in a server-centric manner. Logo region 960 may include a logo of a service operator or other entity and may be optionally displayed. Date/time display 970 may be configurable by the user and may also be optionally displayed.

Icon region 940 is used to display various icons, which may be created and/or enabled by the user. Each icon in icon region 940 can represent a filter or a link to another IPG page or a particular interface. Each filter selects a particular type of programming to be included in the program listings shown in guide region 910. For example, a Pay Per View (PPV) icon 941 may be a filter that selects only PPV programming to be included in the program listings. A Favorites icon 942 may be a filter that selects only channels designated by the user to be among his or her favorites. A Movies icon 943 may be a filter that selects only movies or movie channels. A Kids icon 944 may be a filter that selects only channels for children or programming appropriate for or produced for viewing by children. A Sports icon 945 may be a filter that selects only sports channels or sports-related programming. A Music icon 946 is a link to a music interface. An Options icon 947 may also be a link to a menu of IPG options that the user may select amongst. The options may include (1) configuration and selection/deselection information of IPG related services, (2) custom information such as deactivating some of the filters or accessing the custom condensed listing menus, and others. A Weather icon 948 may be a link to an interface to weather information.

As an illustration, in a system comprising 80 channels of information, the channels are displayed in 10-channel groups having associated with them two half-hour time slots. In this organization, 8 video PIDs are provided to carry the present-time channel/time/title information, one or more audio PIDs are provided to carry the audio barker and/or one or more data PIDs (or other data transport method) are provided to carry the program description data, overlay data, and the like. To fully broadcast interactive program information for up to 24 hours in advance, 192 (e.g., 8*24) video PIDs are provided, along with one or more audio PIDs and, optionally, one or more data PIDs.

The time depth of a program guide, which is defined by the amount of time in programming, is provided in the broadcast video PIDs for the particular channel groups. The channel depth of the program guide is defined by the number of channels available through the guide (as compared to the total number of channels in the system). In a system providing only half of the available channels via the broadcast video PIDs, the channel depth is 50%. In a system providing 12 hours of "look-ahead" time slot, the time depth is 12 hours. In a system providing 16 hours of "look-ahead" time slot and 4 hours of "look-back" time slot, the time depth is +16/−4 hours.

The video streams representing the IPG are sent in a one or more transport streams, within the form of a single program or multi-programs as described above. A user desiring to view the next 1-hour time interval (e.g., 10:00-11:00) may activate a "scroll right" object (or move the joystick to the right when a program within guide region 910 occupies the final displayed time interval). Such activation results in a controller within the terminal noting that a new time interval is desired. The video stream desired for the new time interval is then decoded and displayed. If the corresponding video stream is within the same transport stream (i.e., a new PID), then the stream is simply decoded and presented. If the desired video stream is within a different transport stream, then that transport stream is extracted from the broadcast stream and the desired video stream is decoded and presented. And if the desired transport stream is within a different broadcast stream, then that broadcast stream is tuned, the desired transport stream is extracted, and the desired video stream is decoded and presented.

A user interaction requesting in a prior time interval or a different set of channels results in the retrieval and presentation of the desired video stream. If the desired video stream is not part of the broadcast video streams, then a pointcast session, for example, may be initiated as described above for FIGS. 4A and 4B. For this pointcast session, the terminal sends a message to the head-end via a back channel requesting a particular stream. The head-end processes the request, retrieves the desired stream from the information server, and incorporates the stream within a transport stream as a video PID. Preferably, the desired stream is inserted into the transport stream currently being tuned/selected by the terminal. The head-end further informs the terminal which PID should be received and from which transport stream it should be demultiplexed. The terminal then retrieves the desired video PID. If the video PID is within a different transport stream, the terminal first demultiplexes that transport stream (possibly by tuning a different QAM stream within the forward channel).

Typically, upon completion of the viewing of the desired stream, the terminal indicates to the head-end that it no longer needs the stream. In response, the head-end tears down the pointcast session. The terminal then returns to the broadcast stream from which the pointcast session was launched. However, as described above in FIGS. 6A, 6B, and 6C, the method for "sharing" pointcasts may delay or avoid the need to tear down the pointcast session if another terminal is still utilizing the pointcast. In addition, the above-described pointcast sharing technique more efficiently utilizes the network bandwidth allocated for pointcasts.

Push demand-casts and pull demand-casts are associated with different delays (i.e., latencies). Access to IPG pages with low latency is a desirable feature in interactive program guide. A system that only pushes IPG pages may be able to offer access with the lowest possible latency, whereas a system that only pulls pages may incur significant processing delays in accessing each page.

In accordance with an embodiment of the invention, more frequently accessed IPG pages such as those in the current time slot and near look-ahead time slots, and perhaps prime-time slots, are push demand-cast continually so that access can be achieved with low latency. Less frequently accessed (e.g., far look-ahead) pages are pull demand-cast.

F. Example of Implementational Architectures

Four architectures for delivery of interactive program guide are described below. These architectures are illustrative of the architectures that may be used to implement various aspects of the invention. However, other architectures may also be used and are within the scope of the invention.

Figure 10:
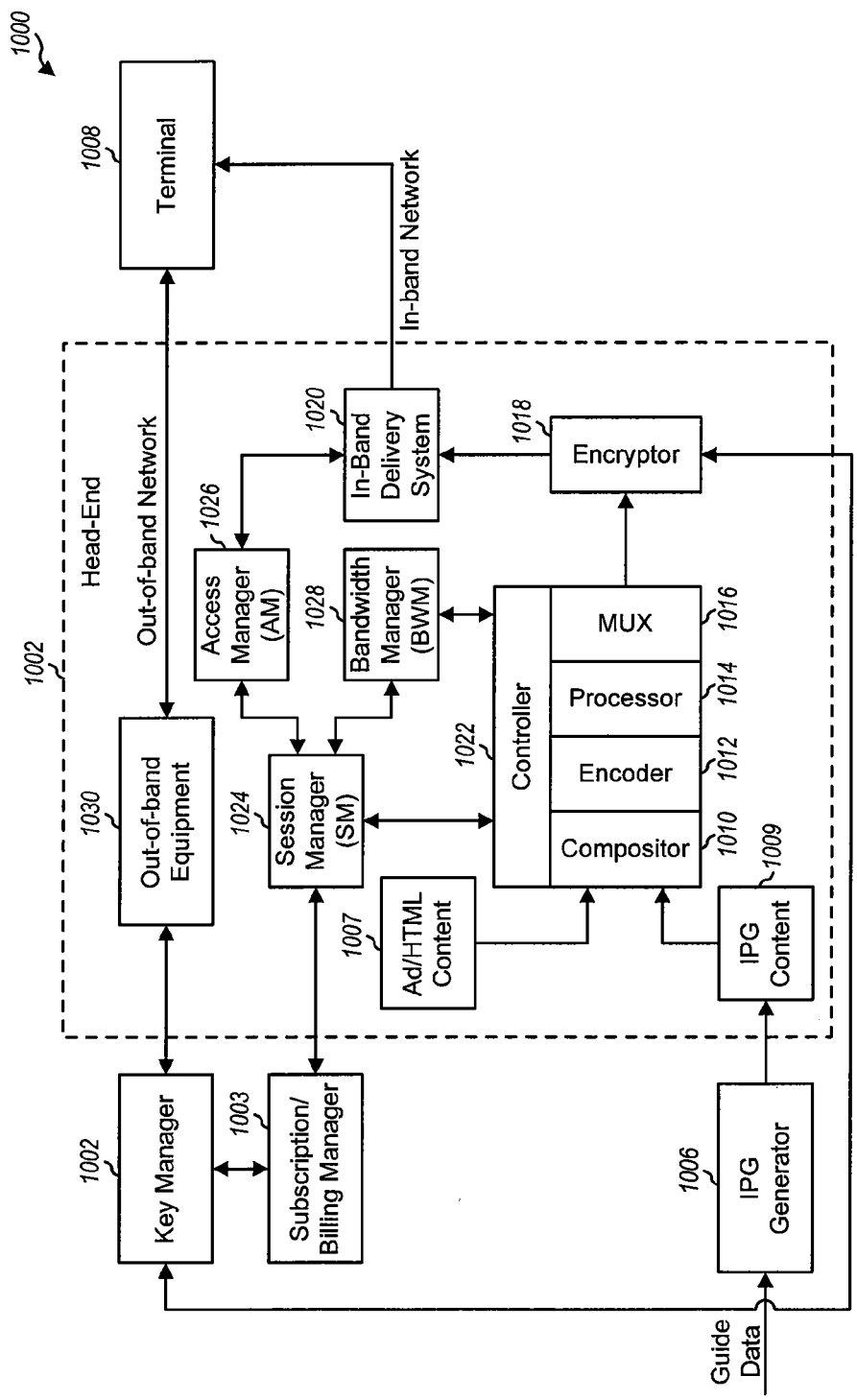
FIGS. 10-13 are block diagrams of first, second, third, and fourth architectures, respectively, for managing delivery of video sequences of an interactive program guide in accordance with embodiments of the invention.

FIG. 10 is a diagram of a first architecture 1000 for managing delivery of video sequences of an interactive program guide in accordance with an embodiment of the invention. First architecture 1000 includes a key manager 1002, a subscription/billing manager 1003, an IPG generator 1006, and a head-end 1002. First architecture 1000 is capable of providing encryption for the IPG content.

Head-end 1002 couples to a number of terminals 1008 via an in-band network and/or an out-of-band (OOB) network. Head-end 1002 includes various elements that couple together and interact with each other to provide the desired functionality. In the embodiment shown in FIG. 10, head-end 1002 includes an advertising/HTML content source 1007, an IPG content source 1009, a compositor 1010, an encoder 1012, a processor 1014, a multiplexer (MUX) 1016, an encryptor 1018, an in-band delivery system 1020, a controller 1022, a session manager 1024, an access manager 1026, a bandwidth manager 1028, and an out-of-band (OOB) equipment 1030.

It is noted that session manager 702 in FIG. 7 encompasses the functionality of a number of elements in FIG. 10, including session manager 1024 and bandwidth manager 1028. Also, it is noted that transport stream generator 704 in FIG. 7 also encompasses the functionality of a number of elements in FIG. 10, including processor 1014 and multiplexer 1016.

Figure 11:
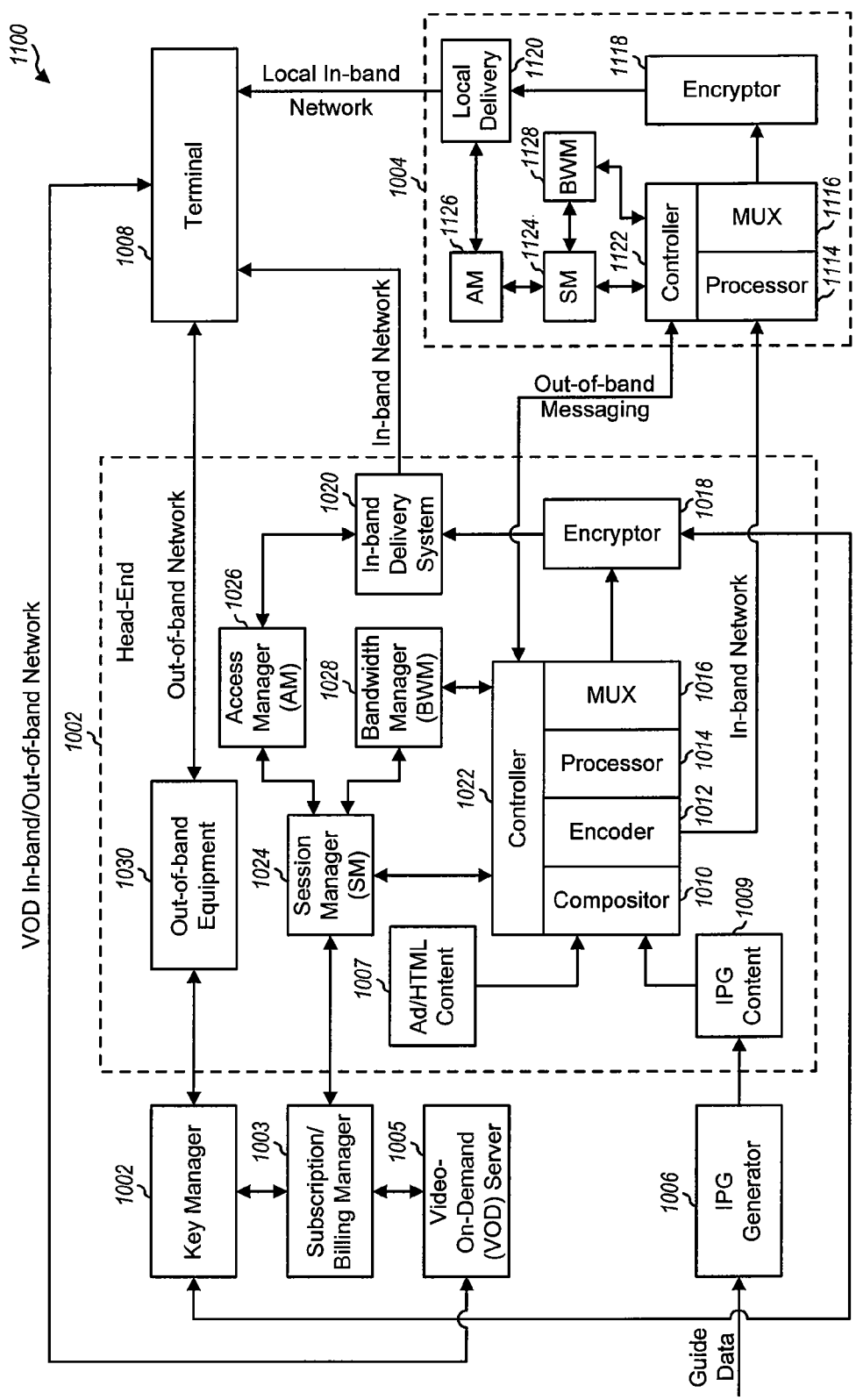

FIG. 11 is a diagram of a second architecture 1100 for managing delivery of video sequences of an interactive program guide in accordance with an embodiment of the invention. Second architecture 1100 includes the elements in first architecture 1000. In addition, second architecture 1100 includes local neighborhood equipment 1004 and a video-on-demand (VOD) server 1005. Second architecture 1100 is also capable of providing encryption for the IPG content.

As shown in FIG. 11, local neighborhood equipment 1004 couples to head-end 1002 via an in-band network and an out-of-band messaging system. Local neighborhood equipment 1004 also couples to a number of terminals 1008 via a local in-band network. Local neighborhood equipment 1004 includes various elements that couple together and interact with each other to provide the desired functionality. Local neighborhood equipment 1004 typically includes a subset of the type of components in head-end 1002. In the embodiment shown in FIG. 11, local neighborhood equipment 1004 includes a processor 1114, a multiplexer 1116, an encryptor 1118, a local delivery system 1120, a controller 1122, a session manager (SM) 1124, an access manager (AM) 1126, and a bandwidth manager (BWM) 1128.

Figure 12:
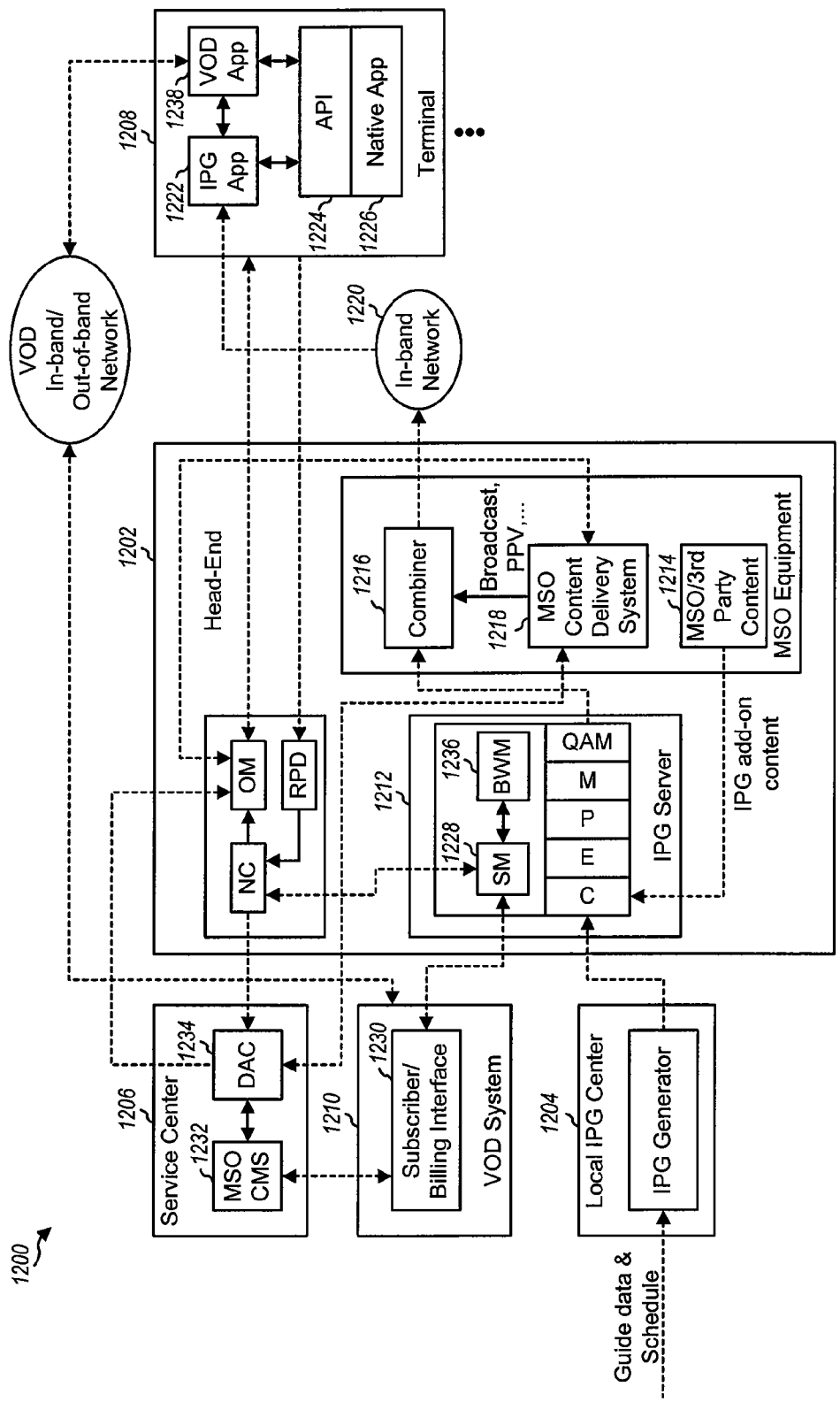

FIG. 12 is a diagram of a third architecture 1200 for managing delivery of video sequences of an interactive program guide in accordance with an embodiment of the invention. Third architecture 1200 includes a local IPG center 1204, a head-end 1202, a service center 1206, and a number of terminals 1208. In addition, the system may be integrated with a video-on-demand (VOD) system 1210 and a corresponding VOD application 1238 at terminal 1208. Third architecture 1200 does not support encryption of the IPG content.

Local IPG center 1204 generates guide page user interface (UI) screens and periodically sends the UI screens to an IPG server 1212 at head-end 1202. A multiple service operator (MSO)/third party IPG add-on content 1214 may be provided to IPG server 1212 from MSO equipment within head-end 1202. For example, the add-on content may include real-time advertisement video or HTML pages for electronic commerce.

IPG server 1212 composes (C), encodes (E), processes (P), multiplexes (M), and modulates (QAM) the IPG content (guide plus add-on content) and sends it to a combiner 1216. Combiner 1216 combines the IPG content with broadcast TV, premium content (e.g., HBO), pay-per-view (PPV), and other content from a multiple service operator (MSO) content delivery system 1218. The combined content is then broadcast to terminals 1208 via an in-band distribution network 1220.

Upon viewer tuning of terminal 1208 to an IPG channel, an IPG application 1222 at the terminal processes the IPG stream and provides the IPG via an application programming interface (API) 1224 to a "native" application 1226 running on the terminal. Native application 1226 decodes and presents the IPG to the viewer.

In one embodiment, the TV program guide for a current time period (1-hour) is broadcast to viewers. In addition, two weeks of look-ahead TV programming may be delivered to viewers on demand via demand-cast. Upon a viewer action of moving a cursor to a look-ahead time interval, the terminal sends a request via a back-channel to a session manager (SM) 1228 (e.g., via an out-of-band channel to a reverse path demodulator (RPD), then to a network controller (NC), then to session manager 1228). Session manager 1228 then causes IPG server 1212 to multiplex the requested IPG page into the IPG stream.

Session manager 1228 also interacts with a subscriber/billing interface 1230 in VOD system 1210 to coordinate access to VOD services from a link in the IPG user interface. The user interface also provides for access to premium content and pay-per-view purchasing by interaction through a two-way interface to an MSO customer management system (CMS) 1232 and digital access controller (DAC) 1234 in service center 1206. DAC 1234 generates digital encryption-related keys.

Third architecture 1200 also includes a bandwidth manager (BWM) 1236. As described above, bandwidth manager 1236 provides techniques to more efficiently utilize the limited bandwidth available for distribution of the IPG.

It can be noted that session manager 702 of FIG. 7 encompasses the functionality of a number of elements in FIG. 12, including session manager 1228 and bandwidth manager 1236. It can also be noted that transport stream generator 704 in FIG. 7 encompasses the functionality of a number of elements in FIG. 12, including the processor (P) and the multiplexer (M).

Figure 13:
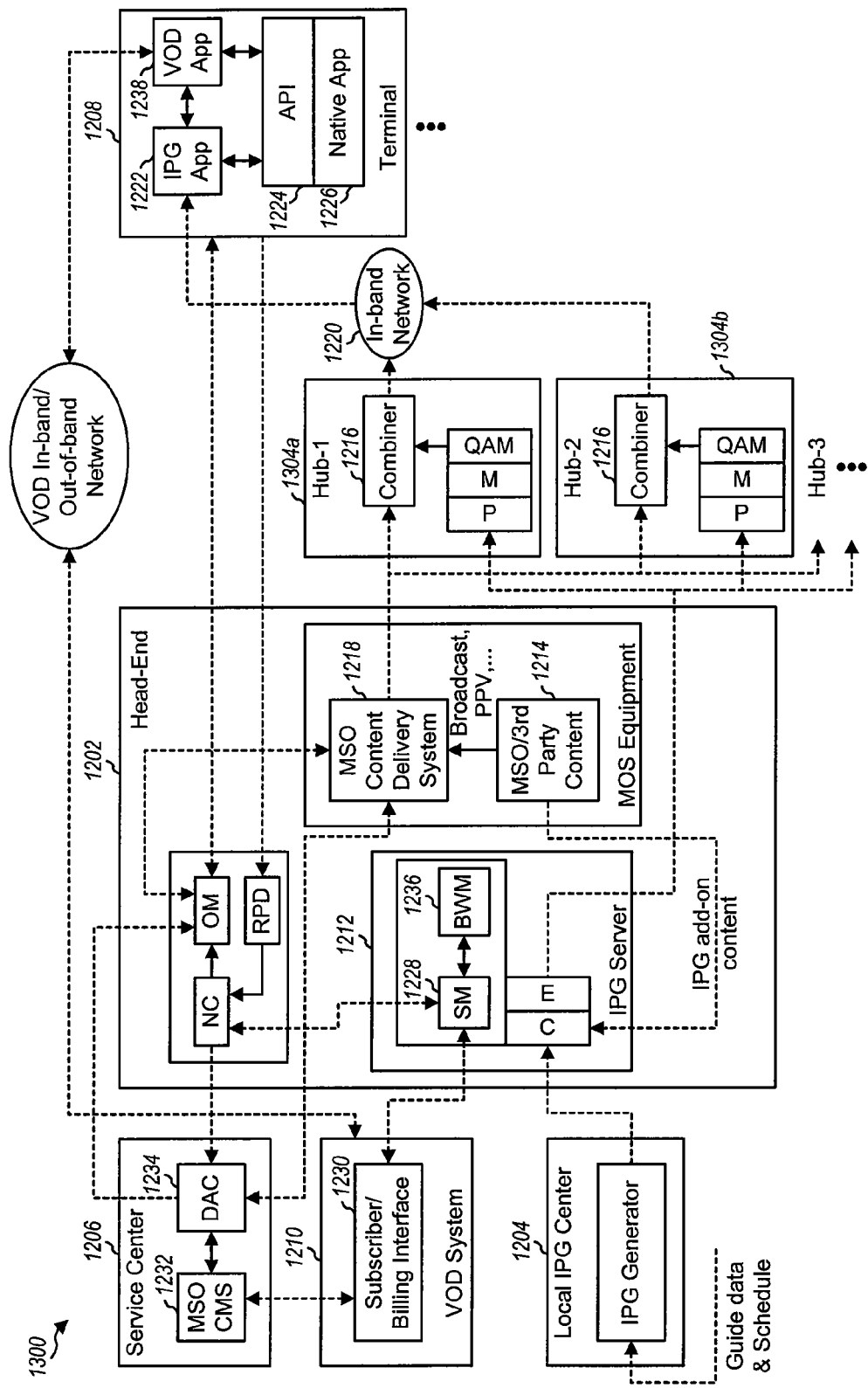

FIG. 13 is a diagram of a fourth architecture 1300 for managing delivery of video sequences of an interactive program guide in accordance with an embodiment of the invention. Fourth architecture 1300 in FIG. 13 is similar to third architecture 1200 in FIG. 12 and also does not support encryption of the IPG content.

Fourth architecture 1300 differs from third architecture 1200 primarily in that some of the elements are distributed from head-end 1202 to a number of hubs 1304 in the distribution system. In particular, combiner 1216, processor (P), multiplexer (M), and modulator (QAM) are moved from head-end 1202 to each hub 1304. Thus, the functionality of transport stream generator 704 is transferred to hubs 1304.

G. Set Top Terminal

Figure 14:
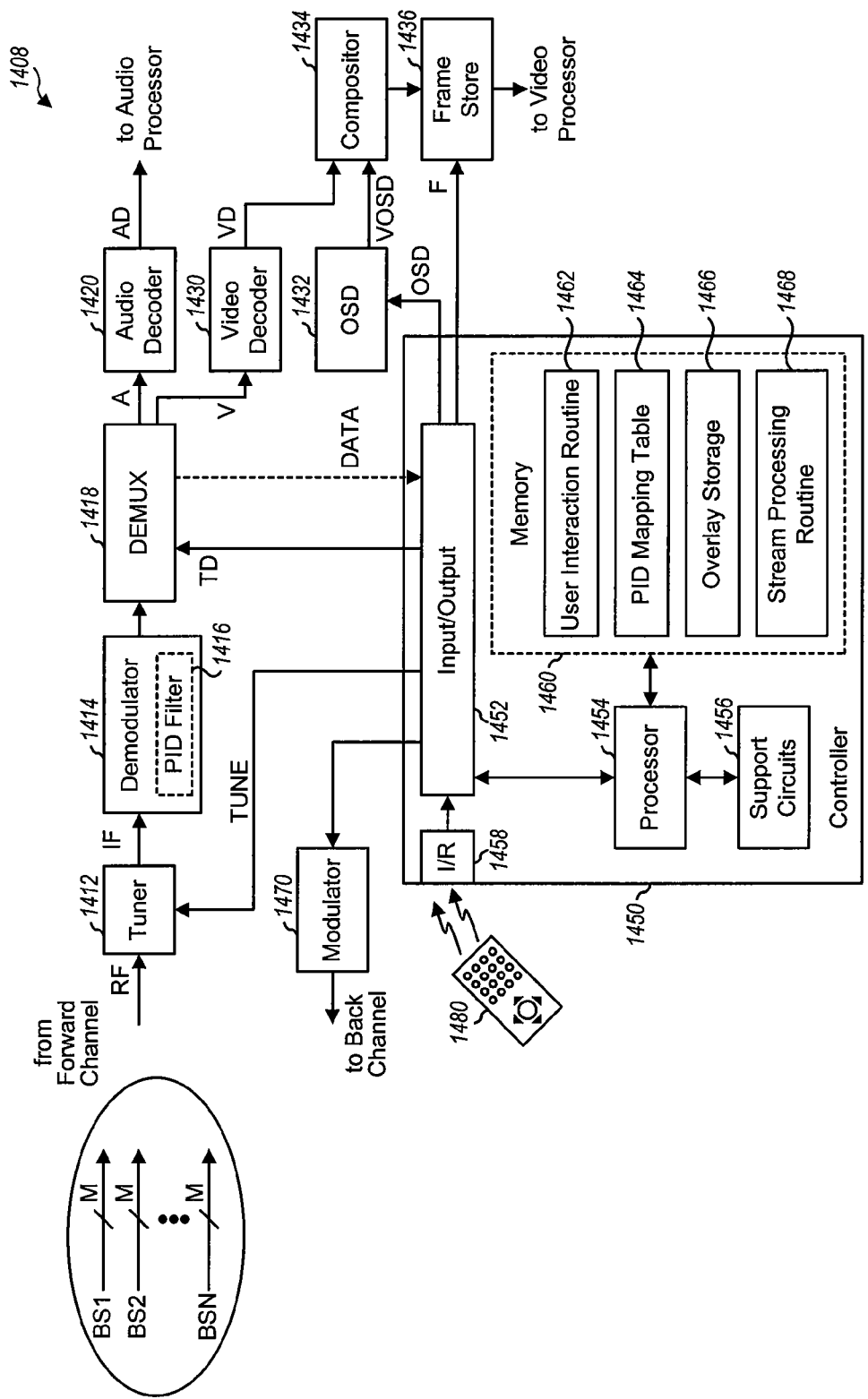
FIG. 14 is a block diagram of an embodiment of set top terminal (STT) 1408 suitable for producing an IPG page and supporting various aspects of the invention.

FIG. 14 depicts a block diagram of an embodiment of set top terminal (STT) 1408 suitable for producing an IPG page and supporting various aspects of the invention. STT 1408 includes a tuner 1412, a demodulator 1414, a transport demultiplexer 1418, an audio decoder 1420, a video decoder 1430, an on-screen display (OSD) processor 1432, a video compositor 1434, a frame store memory 1436, a controller 1450, and a modulator 1470. User interaction is provided via a remote control unit 1480. Tuner 1412 receives, e.g., a radio frequency (RF) signal comprising, for example, a number of broadcast (e.g., QAM) signals from a downstream (forward) channel. Tuner 1412, in response to a control signal TUNE, tunes to and processes a particular broadcast signal to produce an intermediate frequency (IF) signal. Demodulator 1414 receives and demodulates the IF signal to produce an information stream, illustratively an MPEG transport stream. The transport stream is provided to a transport stream demultiplexer 1418.

Demultiplexer 1418, in response to a control signal TD produced by controller 1450, demultiplexes (i.e., extracts) an audio stream A and a video stream V. The audio stream A is provided to audio decoder 1420, which decodes the audio stream and provides a decoded audio stream to an audio processor (not shown) for subsequent presentation. The video stream V is provided to video decoder 1430, which decodes the compressed video stream V to produce an uncompressed video stream VD that is provided to video compositor 1434. OSD processor 1432, in response to a control signal OSD produced by controller 1450, produces a graphical overlay signal VOSD that is provided to video compositor 1434. In an embodiment, during transitions between streams representing different IPG pages, the buffers in the decoder are not reset. As such, the pages seamlessly transition from one page to another.

Video compositor 1434 merges the graphical overlay signal VOSD and the uncompressed video stream VD to produce a modified video stream (i.e., the underlying video images with the graphical overlay) that is provided to frame store unit 1436. Frame store unit 1436 stores the modified video stream on a frame-by-frame basis according to the frame rate of the video stream. Frame store unit 1436 provides the stored video frames to a video processor (not shown) for subsequent processing and presentation on a display device.

Controller 1450 includes an input/output module 1452, a microprocessor 1454, support circuitry 1456, an infrared (IR) receiver 1458, and a memory 1460. Input/output module 1452 forms an interface between controller 1450 and tuner 1412, transport demultiplexer 1418, OSD processor 1432, back-channel modulator 1470, and remote control unit 1480. Microprocessor 1454 cooperates with support circuitry 1456 such as power supplies, clock circuits, cache memory, and the like as well as circuits that assist in executing the software routines that are stored in memory 1460.

Although controller 1450 is depicted as a general-purpose processor that is programmed to perform specific interactive program guide control function in accordance with the invention, the controller can be implemented in hardware as an application specific integrated circuit (ASIC). As such, the process steps described herein are intended to be broadly interpreted as being equivalently performed by software, hardware, or a combination thereof.

In the embodiment shown in FIG. 14, remote control unit 1480 includes an 8-position joystick, a numeric pad, a "Select" key, a "Freeze" key and a "Return" key. User manipulations of the joystick or keys of the remote control device are transmitted to controller 1450 via an infrared (IR) link or an RF link. Controller 1450 is responsive to such user manipulations, executes related user interaction routines 1462, and uses particular overlays that are available in an overlay storage 1466.

After the signal is tuned and demodulated, the video streams are recombined via a stream processing routine 1468 to form the video sequences that were originally compressed. Stream processing routine 1468 employs a variety of methods to recombine slice-based streams, including using PID filter 1416 and demultiplexer 1418. Note that the PID filter implemented illustratively as part of demodulator 1414 is utilized to filter the undesired PIDs and retrieve the desired PIDs from the transport stream. The packets to be extracted and decoded to form a particular IPG page are identified by a PID mapping table 1464. After stream processing routine 1468 has processed the streams into the correct order (assuming the correct order was not produced in the LNE), the slices are sent to (MPEG) video decoder 1430 to generate the original uncompressed IPG pages.

If a transport stream with two PIDs as described above is to be received and processed (e.g., for slice-based decoding), stream processing unit 1468 recombines the intra-coded slices with their corresponding predictive-coded slices in the appropriate order before the recombined streams are coupled to video decoder 1430. This process can be implemented by software or hardware, or a combination thereof. In the slice structure, only one slice is assigned per row and each row is divided into two portions (e.g., the guide portion and the video portion). In order for the receiving terminal to reconstruct the original video picture, one method is to construct the first row from its two slices in the correct order by retrieving two corresponding slices from the transport stream, then construct the second row from its two slices, and so on. In this manner, the terminal processes two PIDs in the same time period.

PID filter 1416 can be programmed to pass the desired PIDs and filter out the undesired PIDs. The desired PIDs are identified by controller 1450 after the viewer selects particular IPG page to review. PID mapping table 1464 is accessed by controller 1450 to identify which PIDs are associated with the desired IPG. If PID filter 1416 is available in the receiver terminal, it is used to retrieve the PIDs containing slices for the guide and video portions. Demultiplexer 1418 then extracts packets from these PIDs and provides the packets to video decoder 1430, in the order in which they arrived. If the STT does not have optional PID filter 1416, then demultiplexer 1418 performs the PID filtering and extracting functions. Depending on the particular STT implementation, a corresponding method is used to recombine and decode slice-based streams.

H. First Messaging Protocol

A specific messaging protocol for communicating between the major components of the system is now described in relation to FIG. 15A through 15D. Other messaging protocols can also be used and are within the scope of the invention.

In an embodiment, the "source" transport stream generator communicates with a terminal via, for example, a one-way in-band channel. The communication may be, for example, in the form of a "demand-cast index table" within a private section of the IPG MPEG transport stream.

FIG. 15A depicts an embodiment of the content of a demand-cast index table. The content may include: (a) a table version number (which increments when the table content changes); (b) a list of available demand-cast streams; (c) an internet protocol (IP) address for the source transport stream generator; (d) a MUX channel number within the source transport stream generator, and (e) a time of day and day of week.

In an embodiment, the terminal communicates with the session manager via, for example, a one-way out-of-band return path. The return path may be implemented, for example, using a user datagram protocol/internet protocol (UDP/IP) service to connect the terminal to a network controller (NC) at the session manager.

FIG. 15B depicts an embodiment of the contents of a message sent from the terminal to the session manager. The message content as shown includes: (a) a demand-cast stream identification; (b) the terminal's identification; (c) the IP address of the source transport stream generator; (d) the MUX channel number within the source transport stream generator; and (e) the message information itself. The message information may indicate: (1) an acquisition of the demand-cast stream by the terminal; (2) a release of the demand-cast stream by the terminal; or (3) a request for the demand-cast stream by the terminal.

In an embodiment, the session manager communicates with the source transport stream generator via, for example, a two-way communications channel. The two-way communications channel may comprise, for example, a TCP/IP connection over an Ethernet network.

FIG. 15C depicts an embodiment of the contents of a message sent from the session manager to the transport stream generator. The message content as shown includes: (a) the demand-cast stream identification; (b) the MUX channel number within the source transport stream generator; and (c) a particular message/command selected from a set of possible messages/commands. The set of messages/commands include: (1) demand-cast stream released (no longer acquired by any terminal); (2) demand-cast stream requested; and (3) a reset command.

Messages from the session manager to the transport stream generator may be acknowledged by the transport stream generator.

FIG. 15D depicts an embodiment of the contents of an acknowledgement message sent by the transport stream generator back to the session manager. An acknowledgement message as shown includes: (a) the demand-cast stream ID; (b) the MUX channel number; (c) the transport stream generator's IP address; and (d) the acknowledgement itself. The acknowledgement may acknowledge (1) release of the demand-cast stream; (2) request for the demand-cast stream; or (3) reset of the transport stream generator.

I. Stream Status and Conversions of Status

The following relates to stream status and conversions of status in accordance with a specific embodiment of the invention. Other stream statuses and conversions of status can also be implemented and are within the scope of the invention.

1. Stream Status Within IPG Multiplex

The transport stream generator models bandwidth usage for each IPG multiplexed transport stream that it is managing. Each demand-cast stream within each transport stream may be either active or inactive. Active streams are currently being multiplexed into the transport stream, and inactive streams are not currently being multiplexed into the transport stream.

FIG. 16 depicts an example showing statuses of a number of active demand-cast streams in an IPG multiplex within a transport stream generator. For each demand-cast stream, the transport stream generator assigns a status with respect to the stream's intended multiplex. Demand-cast stream statuses, in context of the transport stream generator, are:

1) "Active" streams are in the IPG multiplex
   1.1) "Acquired" demand-cast streams are in the multiplex but are used by at least one terminal. They are referenced in the demand-cast index table in the private section of the IPG transport stream. They are not candidates for removal.
   1.2) "Released" demand-cast streams are in the multiplex and are not used by any terminal. They are referenced in the demand-cast index table. They can become "passive".
   1.2) "Passive" demand-cast streams are also technically "released". They are in the multiplex but are not used by any terminal. They are not referenced in the demand-cast index table. They are typically a small fraction of the "released" demand-cast streams. A few oldest 'released' demand-cast streams are forced to the "inactive" status by a maintenance thread. They are candidates for removal.
2) "Inactive" demand-cast streams are not in the IPG multiplex. They are not referenced in the demand-cast index table. They may be inserted in the multiplex Note that the transport stream generator may remove all the "passive" demand-cast streams from their respective IPG multiplexes and replace them with null packets. It may be advantageous to leave "passive" demand-cast streams in the multiplex in case a terminal requests it, in which case the latency will be minimized.

2. Conversions of Status

The transport stream generator receives messages from the session manager. Messages received from the session manager are:

1) "request demand-cast stream"
2) "release demand-cast stream" The "release demand-cast stream" message includes the maximum number of terminals that were registered to the demand-cast stream.
3) "reset"

A. Transport Stream Generator Request Demand-cast Stream

Figure 17A:
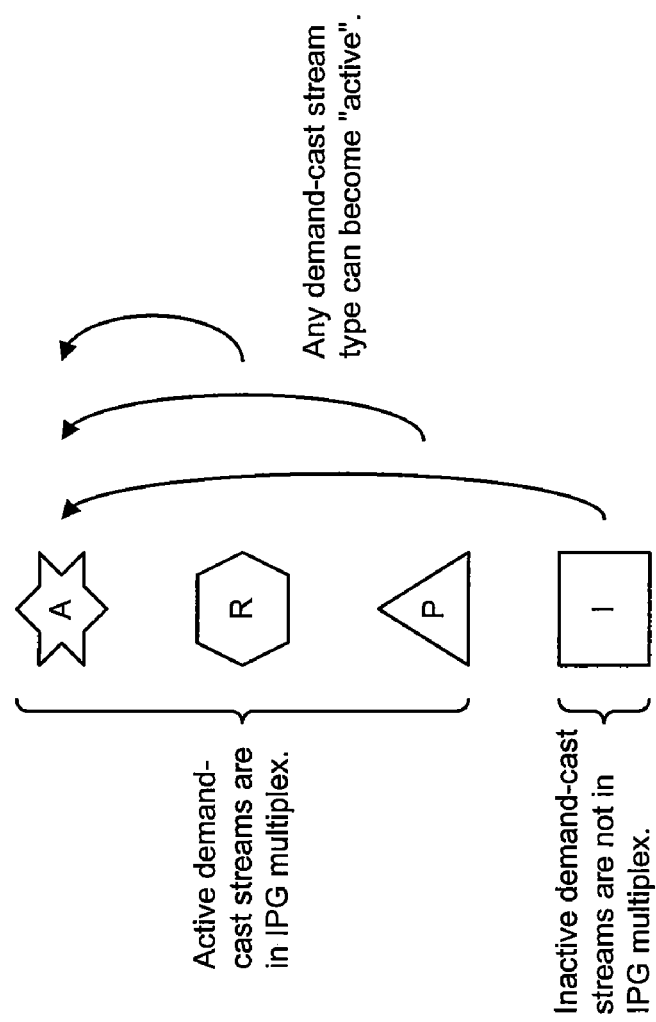
FIGS. 17A and 17B are diagrams illustrating various scenarios for activation and release of a demand-cast stream.

FIG. 17A illustrates the various methods for activating a demand-cast stream. If the transport stream generator receives a "request demand-cast stream" message from the serial number, then the following methods for activating the stream are possible.

1) If the demand-cast stream is currently "inactive", then
   a) In a first case, if there are one or more "passive" demand-cast streams in the corresponding multiplex, then the transport stream generator removes a "passive" demand-cast stream from the multiplex, and replaces it with the new requested demand-cast stream. The transport stream generator adds reference to the new 'active' demand-cast stream in the demand-cast index table. The transport stream generator assigns the status 'active' to the newly inserted demand-cast stream. The transport stream generator acknowledges the session manager for the "request demand-cast stream" message by sending a "success" message back to the session manager.

b) In a second case, if there are no "passive" demand-cast streams in the corresponding multiplex, but a 'released' demand-cast stream is included therein, then the transport stream generator forces the oldest 'released' demand-cast stream to the "inactive" status and then follows the steps described above for the first case.

c) In a third case, if the transport stream generator finds no "passive" or "released" demand-cast stream in the corresponding multiplex, it can not fulfill the request. The transport stream generator acknowledges the session manager for the "request demand-cast stream" message by sending a "fail" message back to the session manager.

2) If the demand-cast stream is currently 'released' or 'passive', then a) The transport stream generator changes the status of the 'released' or 'passive' demand-cast stream to 'acquired.' The transport stream generator also acknowledges the session manager for the "request demand-cast stream" message by sending a "success" message back to the session manager.

B. Transport Stream Generator Release Demand-cast Stream

If the transport stream generator receives a "release demand-cast stream" message from the session manager, then it acknowledges the session manager by sending a "success" message. If the demand-cast stream is currently 'acquired', then the transport stream generator changes the status of the stream to 'released.'

C. Released Stream to Passive Stream Conversion

Removal of a 'released' demand-cast stream can be done. However, such removal, unless necessary, may be disadvantageous. Initially, the reference to the 'released' demand-cast stream is removed from the "demand-cast index table", then a short time later (e.g., few seconds) later the stream can be physically removed from the multiplex. This delay between the removal from the table and the removal from the multiplex prevents a race condition whereby a terminal is acquiring a demand-cast stream while the transport stream generator is in the process of removing it. Therefore, only 'passive' streams are removed in accordance with an embodiment of the invention.

The ratio of 'passive' to 'released' demand-cast stream may be specified in the transport stream generator configuration file. It may be maintained as a percentage (e.g., 10% of 'released' streams are converted to 'passive') or it can be maintained as an absolute number (e.g., so as to ensure that there are usually two or three 'inactive' demand-cast streams).

Figure 17B:
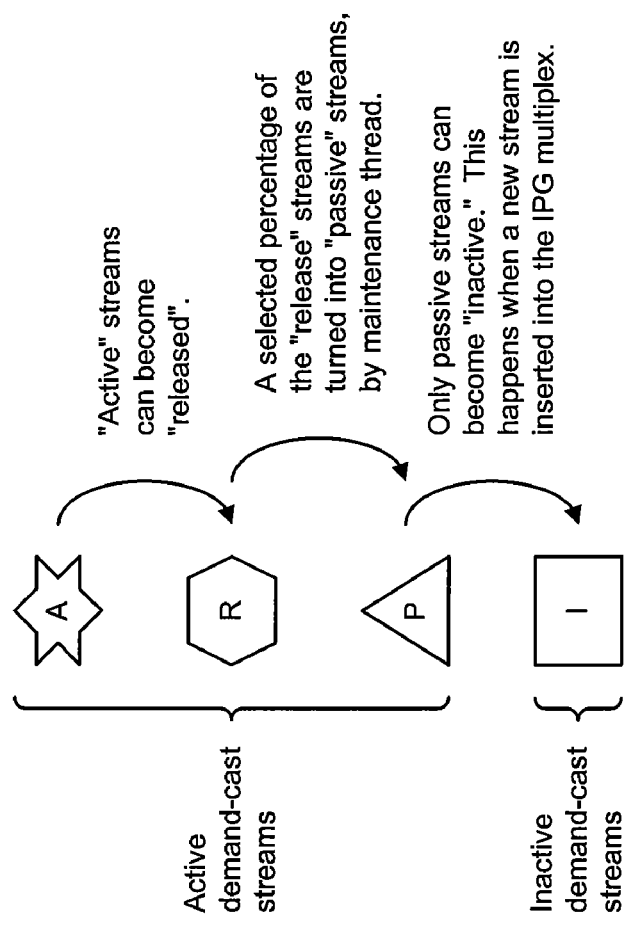

FIG. 17B illustrates an overall process by which a released stream may be converted to a passive stream. Methods for determining which released streams are converted to passive streams include an aging method and a statistical method. In the aging method, the few oldest 'released' demand-cast streams are continually converted to 'passive' status by a maintenance thread. In the statistical method, the "release demand-cast stream" messages include statistical data regarding the demand-cast stream. This data may provide the maximum number of terminals that were on a released stream before it was released. The transport stream generator converts demand-cast streams that have had the least amount of users to 'passive' status.

J. Other Technical Aspects

The following are further technical aspects in accordance with a specific embodiment of the invention. Other variations are also possible and within the scope of the invention.

1. Initial Conditions

Set Top Terminal: When the STT launches the IPG application, it tunes to the QAM carrying the IPG transport stream. When the STT requests its first demand-cast stream, it opens the IPG channel with the session manager. When the QAM is tuned, the STT acquires the demand-cast index table and sends an "Init" command to the session manager.

Session Manager: Initially, the session manager has no knowledge of the IPG multiplex fed to its client STTs. Upon receiving a first "request demand-cast stream" message from a STT, the session manager verifies that it is aware of the MUX ID. MUX ID includes the transport stream processor IP address and MUX channel within the transport stream generator. If the session manager is aware, then nothing happens. And if the session manager is not aware, the transport stream generator opens a communication socket with the source transport stream generator. The session manager maintains a log where it registers all MUXes that it controls. For each MUX in the log, the transport stream generator's IP address and MUX channel number is recorded.

Transport Stream Generator: Initially, the transport stream generator is configured through its own configuration file. Configuration includes the number of demand-cast streams that can be supported by each IPG multiplex. The absolute number of 'passive' streams or the ratio of 'passive' streams to 'released' streams is specified in the configuration file 2. Reset Set Top Terminal: When the STT does not "see" the PID of the demand-cast stream it is acquiring in the demand-cast index table, it acquires a default IPG broadcast PID. If the STT does not see the demand-cast index table, the STT exits the IPG application.

Session Manager: If the session manager is down, upon reset, it looks up transport stream generator log file and sends a reset command to the transport stream generator.

Transport Stream Generator: When the transport stream generator receives a "Reset" command from the session manager, it removes reference to all demand-cast streams in the demand-cast index table in the multiplex referenced by the MUX ID in the reset command. Then a short time (e.g., a few second) later, the transport stream generator removes all the demand-cast streams within the multiplex.

3. Scalability

Set Top Terminal: STT messages regarding demand-cast streams include demand-cast stream ID, transport stream generator's IP address, and the MUX channel number on the transport stream generator.

Session Manager: The session manager can manage more than one transport stream generator. Each IPG multiplex is referred to by the IPG address of the host transport stream generator and the MUX channel number on the transport stream generator.

Transport Stream Generator: Each transport stream generator can manage more than one IPG multiplex.

K. IPG Messaging Scheme

The systems shown in FIGS. 10 through 13 can be used to send interactive program guide (IPG) via broadcast and demand-cast. The IPG pages can be efficiently encoded and transmitted from the head-end by partitioning each IPG page into a number of regions (or portions) and separately encoding and transmitting the requested regions. For example, IPG page 900 shown in FIG. 9 can be partitioned into guide region 910, video region 920, icon region 940, and program description region 950. Each of these regions can then be encoded using a slice-based encoding scheme. Thereafter, the slices for each region can be transmitted from the head-end via a respective assigned PID.

The partitioning of IPG page into regions, coding of the regions using a slice-based encoding scheme, and recombination of the regions at the terminal are described in detail in U.S. patent application Ser. No. 09/466,990, entitled "STREAM INDEXING FOR DELIVERY OF INTERACTIVE PROGRAM GUIDE," and filed Dec. 10, 1999 (now U.S. Pat. No. 6,614,843). Other techniques for efficiently coding and decoding regions of IPG pages are described in U.S. patent application Ser. No. 09/686,739, entitled "TEMPORAL SLICE PERSISTENCE METHOD and APPARATUS FOR DELIVERY OF INTERACTIVE PROGRAM GUIDE," filed Oct. 10, 2000 (now U.S. Pat. No. 6,754,271). These applications are assigned to the assignee of the invention and incorporated herein by reference.

As noted above, many IPG pages may be available to list the programming for a large number of channels over an extended (e.g., two-week) time period. For example, 472 IPG pages may be available for 200 channels for a two-week period if each IPG page includes a guide listing for a group of 10 channels for a one-hour time slot. Broadcasting all of these IPG pages would require a large amount of bandwidth and is typically not necessary. To conserve bandwidth, IPG pages for the current and near look-ahead time slots may be broadcast and other IPG pages may be sent via demand-cast whenever requested by viewers.

For the information distribution systems described above, requests for IPG pages from the terminals are typically sent via an out-of-band network that typically supports a lower bit rate than the in-band network used to send programming and IPG. Thus, efficient techniques for sending demand-cast messages (i.e., requests) from the terminals to the head-end are highly desirable.

An IPG page can be efficiently regenerated at a terminal by "assembling" the various regions that make up the page. Techniques for achieving this are described in the aforementioned U.S. Pat. Nos. 6,614,843 and 6,754,271. One or more of these regions (e.g., the guide and video regions) may be transmitted from the head-end, and one or more other regions (e.g., the icon region) may be generated at the terminal. Using the techniques described in U.S. Pat. No. 6,754,271, a new (e.g., requested) IPG page may be constructed by just replacing one or more existing regions (e.g., the guide region) of the current page with the corresponding regions of the new page. The remaining regions (e.g., the icon and video regions) of the current page are not updated by the new page.

In accordance with an aspect of the invention, only the necessary region or regions not currently received at the terminal or needs to be updated are requested by the terminal, and the head-end transmits only the requested regions. This demand-cast scheme can greatly reduce the amount of bandwidth required to support demand-cast.

In a similar manner, a video or program description may be requested by the terminal for the current IPG page. In this case, using the techniques described in U.S. Pat. No. 6,754,271, only the requested region or regions for the IPG page need to be transmitted. These regions would then replace the corresponding regions in the current IPG page while the remaining regions are not updated.

1. Messaging System for Demand-cast

An aspect of the invention provides an efficient messaging system to facilitate the IPG delivery scheme described above. This messaging system allows the terminals to specifically designate the requested item of information.

Figure 18A:
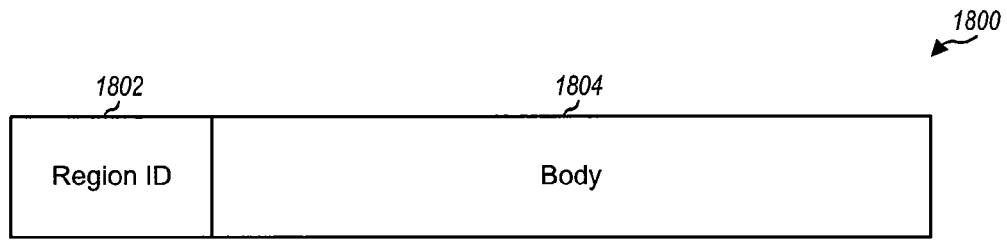
FIG. 18A is a diagram of an embodiment of a message format that can be used to send a demand-cast request.

FIG. 18A is a diagram of an embodiment of a message format 1800 that can be used to send a demand-cast request. In this embodiment, message format 1800 includes a region ID field 1802 and a body field 1804. Region ID field 1802 identifies a particular region of the IPG page being requested. Table 1 lists some of the regions that may be requested and their assigned values for region ID field 1802.

TABLE 1

| Value | Region Requested |
|---|---|
| 0 | Guide region |
| 1 | Video region |
| 2 | Icon region |
| 3 | Program description region |

Different and/or additional regions may be defined for the IPG page and are within the scope of the invention. For example, audio or other data associated with a particular IPG page may also be requested and appropriately identified by region ID field 1802.

Body field 1804 includes the body of the request message. In an embodiment, the format for body field 1804 is dependent on the particular region specified in region ID field 1802. This provides a "hierarchical" message format that is well suited for defining "sub-regions" of a picture in an MPEG encoding system. Message formats for some of the regions are described below.

Figure 18B:
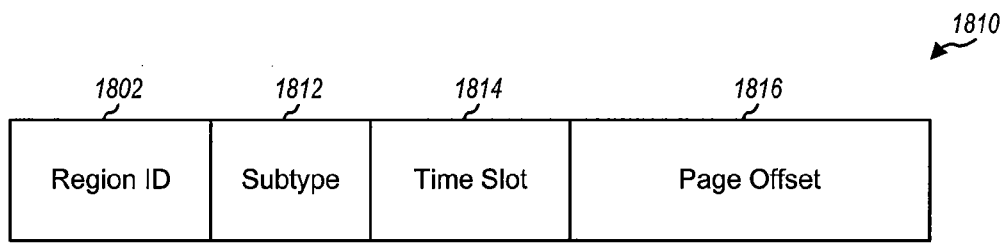
FIGS. 18B through 18D are diagrams of an embodiment of message formats that can be used to send requests for a particular guide listing for a guide region, a particular video for a video region, and an icon region, respectively.

FIG. 18B is a diagram of an embodiment of a message format 1810 that can be used to send a request for a particular guide listing for the guide region. In this embodiment, message format 1810 includes region ID field 1802, a subtype field 1812, a time slot field 1814, and a page offset field 1816. Based on the definition shown in Table 1, region ID field 1802 includes a value of, e.g., zero ("0") to identify the request as being for a guide region.

Subtype field 1812 identifies the particular type of guide being requested. As described above and shown in FIG. 9, a number of filters may be provided to allow a viewer to select a particular type of programming to be included in the guide listing displayed in the guide region. Such filters may include Pay Per View (PPV), Favorites, Movies, Kids, Sports, Music, and so on. Each filter may thus be used to provide a different type of guide listing, including "condensed" listings.

In an embodiment, subtype field 1812 includes a value indicative of the particular filter, if any, selected by the viewer at the time the demand-cast was requested. The terminal has knowledge of the filter currently selected by the viewer, if any, and can automatically fill in this field. Table 2 lists some of the filters that may be selected by the viewer and their exemplary assigned values for subtype field 1812.

TABLE 2

| Value | Filter Selected |
|---|---|
| 0 | None. Regular unfiltered IPG listing |
| 1 | Pay Per View (PPV) |
| 2 | Favorites |
| 3 | Movies |
| 4 | Kids |
| 5 | Sports |

As the viewer requests a particular IPG page at a particular time, the head-end identifies the content of the requested page. For example, if the viewer requests a pay per view page at a particular look-ahead time, and if there is a related condensed listing, then the head-end sends the condensed listing to the terminal. Otherwise, the head-end sends a regular IPG page that includes the requested pay per view listing. The same principle can be applied to other filters.

Time slot field 1814 identifies the particular time slot of the guide listing being requested. As noted above, IPG pages may be available to list programming for an extended time period. If two weeks of guide listing is available and each IPG page covers a one-hour time slot, then 336 time slots are defined for that two-week period. Time slot field 1814 is used to identify the specific time slot being requested. The requested time slot can be calculated based on a modulo (Mod) 336 operation. For example, a requested time slot of 500 can correspond to a time slot of 164. And if the current time slot is 100 according to the Mod 336 operation, then 64 is the requested time slot with reference to the current time.

For clarity, the above scheme is described in the context of guide listing for two-week period and one-hour time slot. Other time periods and time slot durations may also be used and are within the scope of the invention. Also, other schemes to identify the particular time slot being requested can also be contemplated and are also within the scope of the invention.

Page offset field 1816 identifies the particular IPG page selected from among a number of pages available for the selected time slot. As noted above, IPG pages may be available for guide listing for a large number of channels. If 200 channels are available and each IPG page covers a group of 10 channels, then 20 IPG pages may be available for each time slot. Page offset field 1816 is used to identify the specific page being requested.

Again, the IPG page being requested can be identified using various schemes. In one scheme, the IPG pages for all available channels for a particular time slot are numbered consecutively from 0 through N. For example, if 200 channels are available and each IPG page includes guide listing for a group of 10 channels, page 0 may include the guide listing for channels 1 through 10, page 1 may include the guide listing for channels 11 through 20, and so on, and page 19 may include the guide listing for channels 191 through 200. For this scheme, the value in page offset field 1816 identifies the specific page in the time slot corresponding to the requested page. In another scheme, offset value from the current page number is referenced in the page offset field.

In FIG. 18B, the width of each field in message format 1810 is typically dependent on the number of possible values that may be specified for that field. As a specific example, two bits would be sufficient to designate one of four possible regions for region ID field 1802, three bits would be sufficient to designate one of six possible filters (or no filter) for subtype field 1812, nine bits would be sufficient to designate one of 336 possible time slots, and five bits would be sufficient to designate one of 20 possible IPG pages. Of course, additional bits may be provided for some or all of the fields to account for possible future expansion. Thus, any number of bits may be allocated to each of the fields and this is within the scope of the invention.

Figure 18C:

FIG. 18C is a diagram of an embodiment of a message format 1820 that can be used to send a request for a particular video for the video region. In this embodiment, message format 1820 includes region ID field 1802, subtype field 1804, and possibly additional fields. Based on the definition shown in Table 1, region ID field 1802 includes a value of one ("1") to identify the request as being for a video.

For an enhanced IPG, it may be desirable to present another video in the video region that is different from the common video. For example, if the viewer selects a particular filter icon, then a video associated with that filter may be decoded and displayed in place of the common video. As another example, if the viewer selects a preview for a particular program, a video clip for that program may be requested (if it is not already transmitted) and presented for viewing. The video region may thus be used to implement a picture-in-picture feature for IPG. The particular video to be displayed in the video region may be selectable by the viewer or designated by the system. Message format 1820 can be used to request such video.

For such picture-in-picture scenarios, subtype field 1804 can be used to refer to different types of video such as sport and kids-related video, which may be used for targeted advertising. In another embodiment, instead of sub-type field 1804, a channel number may be included in a second field to change to a video when the viewer changes channel. The time slot and page offset fields may not be used in such video requests and these fields may be used to reference more detailed information about the requested video.

In the IPG system described in the aforementioned U.S. Pat. No. 6,614,843, one common video (sometimes referred to as a video barker) is provided for all IPG pages. To regenerate a selected IPG page, the guide region for the selected page is retrieved and recombined with the common video region using a slice-based recombination method described in the aforementioned U.S. Pat. Nos. 6,614,843 and 6,754,271.

Figure 18D:

FIG. 18D is a diagram of an embodiment of a message format 1830 that can be used to send a request for an icon region or other regions such as, for example, request for stock ticker, weather information, other (e.g., restaurant) guide information, and other information. In such embodiments, message format 1830 includes region ID field 1802 and related subtypes and possibly additional fields.

The message formats for the various regions described above in FIGS. 18A through 18D can be defined to have the same lengths (e.g., 32 bits), which may simplify the generation and processing of the messages. Alternatively, the message formats can be defined to have the different lengths, which may be more efficient. The message format for each region may be defined to include as many bits as required to specifically define that region.

2. Other Applications for Messaging and Maintenance Systems

The above-described messaging scheme is especially suited for interactive program guide, which is commonly used for television and broadcast distribution systems. However, the messaging scheme describe above can also be advantageously used for other guide applications such as, for example, dining guide, local shopping, news, and others. In general, the above-described scheme can be used to request delivery of any region (or portion) of any picture. For example, the techniques described above can be used to request delivery of stock quotes, sports scores, headline news, traffic reports, other guides, and so on.

The foregoing description of the preferred embodiments is provided to enable any person skilled in the art to make or use the invention. Various modifications to these embodiments will be readily apparent to those skilled in the art, and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. A method for communication for an interactive information delivery system, comprising:
   supporting, at a headend, an interactive program guide (IPG) comprising a plurality of IPG pages, each IPG page being defined with a plurality of regions;
   partitioning, by a transport stream generator at a headend, a plurality of the IPG pages into a plurality of regions including guide, video, icon and program description regions;
   determining IPG pages to be first provided to a terminal;
   separately encoding each partitioned region of the IPG pages to be first provided to the terminal using slice-based encoding;
   separately transmitting, from the transport stream generator, each encoded region of the IPG pages to be first provided to the terminal toward a terminal, each of the transmitted regions being adapted for assembly into a respective IPG page by the terminal;
   receiving a demand-cast request message including a region identifier to identify at least one region of an IPG page to be provided next to the terminal; and
   transmitting, to the terminal, the at least one region of the IPG page identified by the region identifier for updating only regions of the IPG page at the terminal associated with the region identifier.

2. The method of claim 1, wherein the demand-cast request message further includes a subtype field for identifying a filter that is selected from a group consisting of: pay-per-view, favorites, movies, kids, sports and music.

3. The method of claim 2, wherein the demand-cast request message further includes a page offset field for identifying a particular IPG page.

4. The method of claim 3, wherein the demand-cast request message further includes a time slot field for identifying a time slot of a particular IPG page.

5. The method of claim 1, wherein the demand-cast request message is for a particular video for the video region.

6. The method of claim 5, wherein the particular video is an advertisement.

7. The method of claim 1, wherein programming targeted to a predefined group is transmitted to a plurality of terminals associated with the predefined group.

8. The method of claim 7, wherein the predefined group comprises at least one of an ethnic group and a special interest group.

9. The method of claim 7, wherein the predefined group comprises a group associated with at least one of a school and a business.

10. The method of claim 9, wherein the transmitted IPG pages comprise at least one of class instruction intended for a school group and targeted material.

11. The method of claim 7, wherein the terminals associated with the predefined group are in a single geographic area.

12. The method of claim 7, wherein the terminals associated with the predefined group are among different geographic areas.

13. The method of claim 12, wherein the terminals associated with the predefined group are linked via a network group address.

14. The method of claim 5, wherein the video region comprises a barker video region which, when displayed, provides picture-in-picture video imagery.

15. The method of claim 14, wherein the video displayed within the barker region comprises video requested by a terminal.

16. The method of claim 1, wherein the requested region includes IPG add-on content provided by at least one of a multiple service operator (MSO) and a third party provider.

17. The method of claim 16, wherein the IPG add-on content is provided to an IPO server from MSO equipment within the headend.

18. The method of claim 16, wherein the IPG add-on content comprises at least one of real-time advertisement video and HTML pages adapted to support electronic commerce.

19. Apparatus for interactive information delivery system communication, comprising:
   means for supporting, at a headend, an interactive program guide (IPG) comprising a plurality of IPG pages, each IPG page being defined with a plurality of regions;
   means for partitioning, by a transport stream generator at a headend, a plurality of the IPG pages into a plurality of regions including guide, video, icon and program description regions;
   determining IPG pages to be first provided to a terminal;
   means for separately encoding each partitioned region of the IPG pages to be first provided to the terminal using slice-based encoding;
   means for separately transmitting, from the transport stream generator, each encoded region of the IPG pages to be first provided to the terminal toward a terminal, each of the transmitted regions being adapted for assembly into a respective IPG page by the terminal;
   means for receiving a demand-cast request message including a region identifier to identify at least one region of an IPG page to be provided next to the terminal; and
   transmitting, to the terminal, the at least one region of the IPG page identified by the region identifier for updating only regions of the IPG page at the terminal associated with the region identifier.

20. A system for communication for an interactive information delivery system, comprising:
   an interactive program guide (IPG) content source for supporting, at a headend, an interactive program guide (IPG) comprising a plurality of IPG pages, each IPG page being defined with a plurality of regions;
   a transport stream generator, for partitioning a plurality of IPG pages into a plurality of regions including guide, video, icon and program description regions, each partitioned region being encoded using slice-based encoding; and
   a session manager (SM) for determining IPG pages to be first provided to a terminal, for separately encoding each partitioned region of the IPG pages to be first provided to the terminal using slice-based encoding and for separately transmitting each encoded region of the IPG pages to be first provided to the terminal from the transport stream generator toward a terminal, each of the transmitted regions being adapted for assembly into a respective IPG page by the terminal;

the SM receiving a demand-cast request message including a region identifier to identify at least one region of an IPG page to be provided next to the terminal and causing to be transmitted to the terminal the at least one region of the IPG page identified by the region identifier for updating only regions of the IPG page at the terminal associated with the region identifier.

21. The system of claim 20, wherein:

each of a plurality of terminals is coupled to both the session manager and the transport stream generator via a distribution network; and a terminal-to-SM message for requesting one of the demand-cast streams identifies a particular region of a particular IPG page, the particular region being one of a plurality of regions, the regions including a guide region, a video region, an icon region, and a program description region, the particular IPG page being one of the IPG pages.

22. The system of claim 20, further comprising:

a plurality of local neighborhood equipment including the transport stream generator; and a headend including the session manager.

23. The system of claim 20, wherein TSG-to-terminal messages include a list of available demand-cast streams.

24. The system of claim 20, wherein SM-to-TSG messages indicate stream released, stream requested, or reset for one of the demand-cast streams.

25. The system of claim 20, wherein TSG-to-SM messages include an acknowledgement of stream release, stream request, or reset for one of the demand-cast streams.

* * * * *

UNITED STATES PATENT AND TRADEMARK OFFICE
CERTIFICATE OF CORRECTION

PATENT NO. : 7,707,608 B2
APPLICATION NO. : 11/564881
DATED : April 27, 2010
INVENTOR(S) : Donald F. Gordon et al.

It is certified that error appears in the above-identified patent and that said Letters Patent is hereby corrected as shown below:

Col. 30, line 17: "IPO" should read --IPG--

Signed and Sealed this

Ninth Day of November, 2010

David J. Kappos
*Director of the United States Patent and Trademark Office*